United States Patent [19]
Itoh et al.

[11] Patent Number: 5,841,496
[45] Date of Patent: *Nov. 24, 1998

[54] REFLECTIVE LIQUID CRYSTAL DISPLAY DEVICE

[75] Inventors: Osamu Itoh, Hitachi; Katsumi Kondo, Hitachinaka; Ikuo Hiyama, Hitachi; Tatsuhisa Fujii, Mobara; Naoki Kikuchi, Mobara; Jun-ichi Hirakata, Mobara, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 626,330

[22] Filed: Apr. 2, 1996

[30] Foreign Application Priority Data

Apr. 4, 1995 [JP] Japan ................................. 7-078601

[51] Int. Cl.$^6$ .................... G02F 1/1333; G02F 1/136; G02F 1/1335; G02F 1/133
[52] U.S. Cl. ............................. 349/113; 349/63; 349/73; 349/70; 349/40; 349/41; 349/85; 349/117
[58] Field of Search .................. 359/63, 73, 70, 359/40, 41; 349/85, 113, 117

[56] References Cited

U.S. PATENT DOCUMENTS

| 4,508,428 | 4/1985 | Harada | 349/113 |
|---|---|---|---|
| 5,121,235 | 6/1992 | Matino et al. | 349/85 |
| 5,128,787 | 7/1992 | Blonder | 359/70 |
| 5,206,633 | 4/1993 | Zalph | 345/92 |
| 5,291,322 | 3/1994 | Itoh et al. | 349/117 |
| 5,440,413 | 8/1995 | Kikuchi et al. | 359/73 |
| 5,523,867 | 6/1996 | Akatsuka et al. | 349/117 |

FOREIGN PATENT DOCUMENTS

| 51-69646 | 6/1976 | Japan . |
|---|---|---|
| 58-219526 | 12/1983 | Japan . |
| 62-106435 | 5/1987 | Japan . |
| 4-274217 | 9/1992 | Japan . |

*Primary Examiner*—William L. Sikes
*Assistant Examiner*—Julie Ngo
*Attorney, Agent, or Firm*—Antonelli, Terry, Stout & Kraus, LLP

[57] ABSTRACT

A reflective liquid crystal display device has a liquid crystal cell formed by laminating upper and lower orientation layers 11 and 21, upper and lower electrodes 14 and 24, upper and lower substrates 12 and 22, and upper and lower polarizers 13 and 23 arranged in order above and below a liquid crystal layer 10 so that they may face their counterparts respectively. The liquid crystal cell is provided with viewing angle dependence so that the light transmission ratio of the dark display section to the bright display section for the light incident at the required angle may be less than 2 at the required azimuth angle of the liquid crystal cell, and the direction of the required azimuth angle is aligned with the direction of the main light source incident into the liquid crystal cell.

6 Claims, 20 Drawing Sheets

FIG. 5
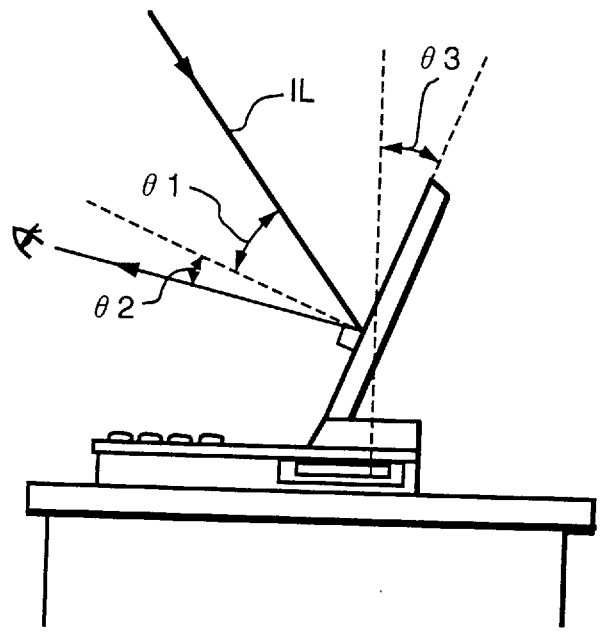
FIG. 6
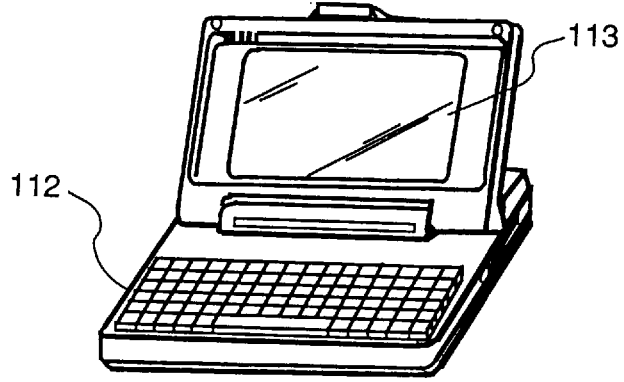
FIG. 7
| | A | B | C | D | E | F | G | H | I | J |
|---|---|---|---|---|---|---|---|---|---|---|
| θ3 | 25° | 30° | 20° | 30° | 30° | 25° | 30° | 30° | 30° | 30° |
| θ2 | -10° | 0° | 0° | 0° | 0° | 0° | 0° | -10° | -10° | 0° |

ΔND OF LIQUID CRYSTAL LAYER (nm)

REFLECTIVE LIQUID CRYSTAL DISPLAY DEVICE

BACKGROUND OF THE INVENTION

The present invention relates to a reflective liquid crystal display device, particularly to a monochromatic or color reflective liquid crystal display device suitable for a large screen high definition display using XY electrodes.

The present invention relates to a reflective liquid crystal display device, characterized by low consumption of electric power, which can produce a colorless monochromatic display with high brightness.

As this information-oriented society develops, it is expected that portable information terminals will spread so that every person eventually will have one. Although specifications for such portable information terminals are not defined clearly yet, they will be provided with functions for effecting communications with host computers, as well as information processing functions.

A display device to be mounted on each of those terminals will thus be expected to be thin, light in weight, and low in power consumption, and furthermore, color display and animation display will be required, since host computers are all multimedia type devices.

A display device that satisfies "thin, light in weight, and low in power consumption" requirements cannot be found except for reflective liquid crystal display devices at present. Conventional reflective liquid display devices, however, correspond only to monochromatic and still picture display devices.

One conventional technology for such a liquid crystal display device was disclosed in Japanese Patent Application Laid-open Sho No. 51-69646, in which flat and slant faces are overlapped alternately on a saw-tooth shaped reflector, and in Japanese Patent Application Laid-open Sho No. 58-219526, in which the reflector is covered with an aluminum foil or aluminum layer on which hexagonal patterns, pyramid patterns, or trapezoidal patterns are embossed.

In a conventional liquid crystal display device, a reflector is incorporated in a liquid crystal cell. In addition, Japanese Patent Application Laid-open Sho No. 62-106435 disclosed a liquid crystal display device whose reflector is incorporated in a liquid crystal cell by using an electrode formed with metal, such as aluminum, as both a reflector and an electrode.

Another conventional technology relating to a liquid crystal device was disclosed in Japanese Patent Application Laid-open Hei No. 4-274217, in which a diffraction grating pattern reflector having an angle to the display surface of a liquid crystal cell and the liquid crystal cell is provided with a reflector on the outside. This technology was designed to improve the luminance of the monochromatic reflective liquid crystal display devices.

However, the former conventional technology could not solve the problem that the luminance was reduced in the bright display section close to the dark display section, that is, a problem that a shadow appears, dark display is duplicated, and the user's visibility is lost significantly.

On the other hand, the latter conventional technology has a problem in that the luminance is too low to obtain satisfactory color display even when color filters are combined with a reflector incorporated in the liquid crystal cell.

A reflective liquid crystal display device produces a display by using an external light as a light source, and since a back light is unnecessary, it is thin and consumes low electric power, so that it is suitable for battery operation. The display device can be also mounted on a portable information terminal of the type which is expected to become very popular in the future.

An improvement in the display quality, specifically, an improvement in brightness of a display at the time of a light display and a colorless monochromatic display are current objectives for a reflective liquid crystal display device.

For example, the use of a blaze-shaped reflector having angles for a display surface of a liquid crystal display device and a liquid crystal display device having the reflector has been known.

A reflector in an angled waveform shape in which a plane and a slant face are alternately disposed is also known, and further a reflector having a surface of aluminum foil or aluminum layer which is subjected to an embossing finish in a honeycomb pattern, pyramid shape, or trapezoid shape also has been known.

However, an improvement in brightness at the time of a bright display and a colorless monochromatic display cannot be realized by merely specifying the shape of the reflector.

On the other hand, retardation of a phase plate and an arrangement of a phase plate and a polarizer has know. A distribution of a refractive index in three axes directions of the phase plate also is known.

An improvement in brightness of a bright display and the colorless monochromatic display, however, cannot be realized by merely specifying optical characteristics of the phase plate and the arrangement of the phase plate and the polarizer.

An improvement in the brightness of a display and a colorless monochromatic display by a reflective liquid crystal display device are not considered in the conventional techniques and there are the following problems.

As a reflector used for the reflective liquid crystal display device, there are a reflector (plane reflector) having a reflection surface which is in parallel with a plane of a liquid crystal substrate and a reflector (directional reflector) having a reflection surface which is inclined to the substrate plane.

The plane reflector is usually used for a conventional reflective liquid crystal display device. There is a problem in that the surface brightness is low in the reflective liquid crystal display device using a plane reflector.

The reason for this problem will now be described. The user of such a display device usually looks at a liquid crystal display device from the front in many cases.

As it is known, a liquid crystal display device is constructed by sandwiching and enclosing a liquid crystal layer between two upper and lower transparent substrates.

An upper electrode having a matrix shape and an upper orientation layer are provided for the under surface of the upper substrate, and a phase plate and an upper polarizer are provided for the top of the upper substrate. A lower electrode in a matrix state and a lower orientation layer are provided for the top of the lower substrate and a lower polarizer is provided for the under surface of the lower substrate. The above component elements form the liquid crystal display device.

A plane reflector is disposed on the rear side of the liquid crystal display device, thereby forming a reflective liquid crystal display device.

In case of using a plane reflector, as mentioned above, when the user is positioned in front of the device, light regularly reflects toward the user from a light source positioned in front of the device.

Since the user also is positioned in front of the liquid crystal display device, however, the light from the light source is shielded by the user and is not incident on the liquid crystal display device.

That is, light incident on the liquid crystal display device from the front direction are first reflected by the clothes, the face or the like of the user only, and so its intensity is weak, with a result that sufficient incident light cannot be obtained.

Light incident on the device from an oblique direction without being shielded by the user, like light from a light source or the like, is regularly reflected by the plane reflector and is obliquely emitted to the opposite side. Since the light isn't reflected toward the user, even if it is strong light, it doesn't contribute to the surface brightness.

In a reflective liquid crystal display device using a plane reflector, since the user interferes with the optical path of the incident light as mentioned above, a sufficient illumination cannot be obtained, so that only low surface brightness is derived.

A reflective liquid crystal display device using a directional reflector so as to obtain high brightness is known. The problem in this case will be described with reference to FIG. 28. In FIG. 28, reference numeral 31 denotes a directional reflector.

The directional reflector, which is also called a blaze-shaped reflector, has a plurality of fine reflecting faces which are inclined in a specific direction. Although the size of each of the reflection faces is enlarged in the diagram, it is equal to, for example, 35 $\mu$m and has an inclination angle (blaze angle) from the plane which is set to, for example, 20°.

In this case, therefore, the light regularly reflected toward the user along a normal line of a display surface is shown by a solid line incident on the liquid crystal display device 1 from the oblique direction, namely, light from the light source $L_1$, facing in the oblique direction according to the inclination of each of the reflecting faces of the directional reflector 31.

Since the light from the light source $L_1$ facing in the oblique direction directly enters the liquid crystal display device without being shielded by the user, an illumination of a large amount is obtained, so that a display having a surface brightness which is consequently higher can be obtained in this case.

In the reflective liquid crystal display device using the directional reflector 31, although an improvement in the display brightness can be certainly obtained, there occurs a problem in that the display tends to be colored.

The reason why the coloring occurs will now be described.

In the reflective liquid crystal display device, light passes through the liquid crystal display twice before the light reaches the user, that is, when the light enters the element and when the light is reflected.

When the brightness of the light of an optional wavelength $\lambda$ passing through the liquid crystal display is set to B($\lambda$), it is expressed by the following equation:

$$B(\lambda)=E(\lambda)\times T_E(\lambda)\times R(\lambda)\times T_R(\lambda) \qquad (1)$$

where E($\lambda$) is the intensity of the incident light, $T_E(\lambda)$ is a transmission factor of the liquid crystal display for the incident light, R($\lambda$) is the reflectance of the reflector, and $T_R(\lambda)$ is the transmission ratio of the liquid crystal display when the light is reflected.

An aspect of the coloring is dependent on the wavelength of the brightness B($\lambda$). The incident light intensity E($\lambda$) doesn't depend on the wavelength since the incident light is illumination or a natural light which can be regarded as colorless (white color). The reflector can be formed in a manner such that the reflectance R($\lambda$) doesn't also depend on the wavelength. The dependency on the wavelength of the brightness B($\lambda$) is determined by the product of $T_E(\lambda)$ and $T_R(\lambda)$ as shown by the following expression:

$$B(\lambda)\propto T_E(\lambda)\times T_R(\lambda) \qquad (2)$$

On the other hand, since the transmission spectrum of the liquid crystal display depends on an angle, the transmission ratio $T_E(\lambda)$ of the liquid crystal when the light enters and the transmission ratio $T_R(\lambda)$ of the liquid crystal display when the light is reflected are determined by the angles of the optical path when the light is incident thereon and when the light is reflected, respectively.

An attention is accordingly paid to the angle of the light incident on the liquid crystal display. The liquid crystal display denotes the liquid crystal display device.

In the case of using a plane reflector, the optical path when the light is incident and the optical path when the light is reflected are in the direction of the normal line of the liquid crystal display.

When a transmission spectrum of the liquid crystal display in the normal line direction is set to $T\perp(\lambda)$ and a plane reflector is used, $T_E(\lambda)=T_R(\lambda)=T\perp(\lambda)$ is obtained. If only the transmission spectrum $T\perp(\lambda)$ doesn't have a wavelength dependency, the brightness B($\lambda$) becomes colorless.

For this purpose, the conventional liquid crystal display using a plane reflector is designed so that the transmission spectrum $T\perp(\lambda)$ becomes colorless.

On the contrary, when the directional reflector 31 in FIG. 28 is used, although the optical path when the light is reflected is in the normal line direction of the liquid crystal display, the optical path at the time when the light is incident is in a direction oblique to the normal line of the plane of the liquid crystal display, as shown in the diagram.

As mentioned above, since the transmission spectrum of the liquid crystal display depends on the angle, even if the transmission spectrum $T\perp(\lambda)$ in the direction of the normal line of the plane has no wavelength dependency, the transmission spectrum in the oblique direction is not always colorless, but is rather often colored. In this case, therefore, the display is colored.

When the display is colored as mentioned above, the visibility of the liquid crystal display device is remarkably deteriorated, so that the colorlessness is an important characteristic of the display device, in addition to the brightness. If the colorlessness of the display is deteriorated in association with a high brightness, high performance cannot be obtained.

Consequently, in the conventional reflective liquid crystal display device, since both the enhancement of brightness and the colorlessness are not realized, there is a problem in that a reflective liquid crystal display device with high brightness and excellent visibility cannot be obtained.

SUMMARY OF THE INVENTION

An object of the present invention is, therefore, to solve the above stated problems and provide a reflective liquid display device with high luminance and with no dark display shadow in a monochromatic or color display.

The above stated object of the present invention can be achieved by use of a reflective liquid crystal display device comprising a reflector, and a liquid crystal cell formed by laminating upper and lower orientation layers, upper and lower electrodes, upper and lower substrates, and upper and lower polarizers arranged in order above and under a liquid crystal layer so that they may face their counterparts, respectively.

The liquid crystal cell is provided with a viewing dependence which produces a transmission ratio of dark display section to bright display section of less than 2 for the light incident at a required angle, at their required azimuth angle, and the direction of the required azimuth angle is aligned to the direction of the main source light incident into the liquid crystal cell.

The object of the present invention can also be achieved by aligning the direction of the required azimuth angle to the user's azimuth angle of 90° or to the horizontal direction of the reflective liquid crystal display device.

More particularly, a reflective liquid crystal display device comprises a liquid crystal cell formed by a laminating polarizer, an upper substrate, an upper electrode, an upper orientation layer, a liquid crystal layer, a lower orientation layer, a lower electrode, and a lower substrate, in that order.

The object of the present invention can be achieved by forming a reflector between the lower electrode and the lower substrate so that the main source light incident into the liquid crystal cell may reflect in the direction of the viewing angle ±10°, and forming a color filter between the upper substrate and the reflector, or by forming the reflector between the lower electrode and the lower substrate so that the main source light incident into the liquid crystal cell may reflect in the direction of the viewing angle 20°, and forming a color filter between the upper substrate and the reflector.

Furthermore, the molecular axis of the liquid crystal layer is aligned to be vertical to the direction of the main light source incident into the liquid crystal cell when a voltage is applied to the liquid crystal layer.

According to each of the above stated constructions, the required azimuth angle direction of the liquid crystal cell having a viewing angle dependence which produces a contrast ratio closer to 1 at the required azimuth angle to the light incident at the required angle is aligned to the incident direction of the main light, while the liquid crystal display device is used.

The difference in luminance between the light passing the bright display section and reflected through the bright display section and the light passing the dark display section and reflected through the bright display section is eliminated to provide a reflective liquid crystal display device with good visibility and with no shadow.

Generally, the user sits opposite the liquid crystal display device when using it under the main source light from above. In other words, the user normally positions the liquid crystal display device horizontally and uses it under light from an overhead source, so if the direction of the required azimuth angle is aligned with the upper direction of the display surface, the appearance of a shadow can be prevented.

If the liquid crystal display device is used under a special condition, the direction of the required azimuth angle is aligned with the horizontal direction of the liquid crystal display device.

On the other hand, if a reflector is formed between the lower electrode and the lower substrate, that is, on the lower substrate (reversal arrangement), light will not pass the lower substrate. As a result, the problem that incident light and reflected light pass different color filters is solved and incident light can be reflected directly along the user's viewing axis.

In other words, the reflector satisfies the direct reflection requirement, so that the luminance to be absorbed by the color filters is compensated, producing a reflective color liquid crystal display device which is bright and has a good visibility.

It is an object of the invention to provide a reflective liquid crystal display device in which an enhancement of the brightness of the display and a colorlessness of the display are simultaneously realized.

The object of the present invention is accomplished by a liquid crystal display device having a phase plate and a directional reflector, wherein, when the refractive indices of the phase plate in the directions of two electro-optical principal axes which cross perpendicularly to each other in a plane of the phase plate are set to $n_x$, and $n_y$ ($n_x > n_y$) and the refractive index of the phase plate in the thickness direction is set to $n_z$, the following expression is satisfied:

$$0.3 \geq (n_Z - n_X)/(n_Y - n_X)$$

The object of the present invention is accomplished by a liquid crystal display device, wherein, when a retardation of the phase plate lies within a range of from 320 nm to 420 nm, the direction which halves the direction of an orientating process of two orientation layers disposed on facing surfaces on upper and lower transparent substrates which sandwich a liquid crystal layer is set to an azimuth 0°, and the azimuth is defined as being counterclockwise when viewed from the outside of the upper transparent substrate, an azimuth of an absorption axis of a lower polarizer lies within a range from 140° to 185°, an azimuth of a slow axis of the phase plate lies within a range of from 45° to 80°, and an azimuth of an absorption axis of an upper polarizer lies within a range from –10° to 35°.

Further, the object of the present invention is accomplished by a liquid crystal display device, wherein the retardation of the phase plate lies within a range of from 540 nm to 680 nm, an azimuth of an absorption axis of the lower polarizer lies within a range of from 140° to 185°, an azimuth of a slow axis of the phase plate lies within a range of from 45° to 80°, and an azimuth of an absorption axis of the upper polarizer lies within a range of from 90° to 35°.

The reason why the object is accomplished by the invention will be described hereinbelow.

In accordance with the present invention, both of transmission spectra in the direction of a normal line of a plane and in the oblique direction of the liquid crystal display are simultaneously made colorless by the above means.

First, means for making the transmission spectrum in the direction of the normal line of the plane of the liquid crystal display will be described.

A high transmission ratio, as well as a high contrast ratio (approximately 10:1 in case of the reflective), in addition to colorlessness of the transmission spectrum are required for the liquid crystal display. In order to satisfy all of the required characteristics, the optical conditions of the polarizer and the phase plate, that is, the azimuth of the transmission axis of the polarizer, the azimuth of the slow axis of the phase plate, and a phase difference of the phase plate, are optimized, in accordance with the present invention.

For the optimization of the optical conditions in the direction of the normal line of the plane, as a phase difference of the phase plate, attention is given to the phase difference defined from a difference between the refractive indices $n_x$ and $n_y$ ($n_x > n_y$) in the directions of the electro-optical principal axes of two kinds in the plane of the phase plate. Although the number of the phase plates can be set to an optional number, one phase plate is used here in consideration of avoiding an increase in cost.

Means for making both of the transmission spectra in the direction of the normal line of the plane and in the oblique direction of the liquid crystal display colorless will now be described.

An angle of view of the optical characteristic depends on the refractive index ratio of the three axes of the phase plate.

In accordance with the present invention, therefore, the refractive index ratio of the three axes of the phase plate is specified by the following expression:

$$0.3 \geq (n_Z > n_X)/(n_Y > n_X)$$

While holding the optical conditions of the phase plate and the polarizer, which make the transmission spectrum in the normal line direction of the plane colorless, the refractive index $n_z$ in the direction of the thickness of the phase plate is optimized.

Consequently, even in the case where a directional reflector is used and the optical path becomes oblique to the normal line direction of the plane of the liquid crystal display, the transmission spectrum at the time of the light incident becomes colorless and the transmission spectrum in the normal line direction of the plane is colorless, so that the transmission spectrum when the light is reflected becomes consequently colorless. As will be obvious from the expression (2), a colorless display is obtained by the reflective liquid crystal display device. Since a directional reflector is used in this case, a higher brightness is obtained, so that both of the higher brightness and a colorless display can be achieved.

BRIEF DESCRIPTION OF THE DRAWINGS

FIG. 5 is a diagram which shows the definition of the light incident angle, the user's viewing axis angle, and the liquid crystal display tilt angle;

FIG. 6 is a oblique view of a lap-top personal computer on which the liquid crystal display device of the present invention is mounted;

FIG. 7 is a table which shows the measurement result of the display tilt angle and the user's viewing angle;

DESCRIPTION OF THE INVENTION

Before explaining details of the embodiments of this invention, the causes of the shadow problem, which is a problem specific to reflective liquid crystal display devices, and problems of reflective color display, as well as the methods of solving those problems will be explained in detail below.

Figure 19:
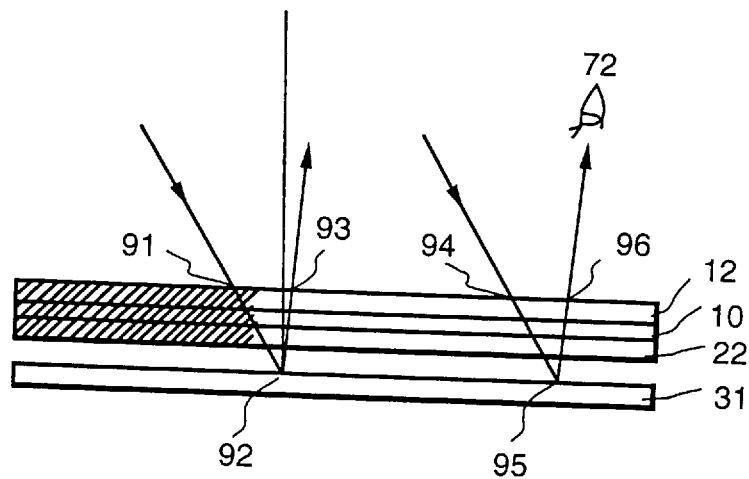
FIG. 19 is a cross section of a reflective liquid crystal display device for explaining the problem of shadow.

At first, the shadow problem will be explained. FIG. 19 shows the cross section of a reflective liquid crystal display device which may be used to explain the shadow problem. The liquid crystal cells are made up of an upper substrate 12, a liquid crystal layer 10, and a lower substrate 22.

As shown in FIG. 19, a reflector 31 is located under the lower substrate 22, and the lower substrate 22 is located between the reflector 31 and the liquid crystal layer 10 so that the lower substrate 22 separates the liquid crystal layer 10 from the reflector 31. The reflection surface of the reflector 31 is in parallel to the flat surface (display surface) of the upper substrate 12. This is a characteristic of the present invention.

FIG. 19 omits other elements than the ones mentioned. The light incident on the liquid crystal cells is reflected by the reflector 31, and then passes through the liquid crystal cells again and reaches the eyes of the user 72.

The light intensity recognized by the user 72 is determined by the product of the following three (3) elements.

T∥: Transmission ratio of liquid crystal cell for incident light

T⊥: Transmission ratio of liquid crystal cell for transmitted light

R: Reflection factor of reflector

The hatched area in FIG. 19 is a dark display section. Here, viewing of the bright display section away from the area around the boundary with the dark display section will be explained first. Light incident at the point 94 is located in the bright display section.

This light, reflected at the reflecting point 95 of the reflector 31, passes through the bright display section and exits from the point 96 and reaches the eyes of the user 72, which is in the direction of the user's viewing axis.

On the other hand, when watching the bright display section near the boundary with the dark display section, the incident light reaches the point 91 located in the dark display section. After reflecting at the reflecting point 92, the light exits from the point 93 located in the bright display section.

In this way, the user watches the light going into the bright display section and reflecting therefrom and the light going into the dark display section and reflecting therefrom. Both portions of light enter into the liquid crystal cells at the same angle. However, the appearance of a shadow is caused by the difference of the light transmission ratio between the dark display section and the bright display section of the liquid crystal cells.

In other words, if the light transmission ratio of the bright display section is larger than the light transmission ratio of the dark display section, then the brightness of the light going into the dark display section and reflecting from the section becomes lower than that of the light going into the bright display section and reflecting from the section.

As a result, the dark display section looks like it is reflecting its own shadow. This is why no shadow appears if the ratio of the light transmission factor of the dark display section to the bright display section in the direction of incident light (hereafter, to be referred to as the contrast ratio) is 1. The further the contrast ratio is from 1, the more clearly the shadow appears.

Furthermore, the shadow is affected significantly by the structure of the reflector. In the case of a reflective liquid crystal display device having a flat reflector whose reflection surface is parallel to the display surface, the user watches the display surface with the reflected light containing scattering light.

In other words, the reflected light in this case is composed light reflected from various directions. The difference of the light transmission ratio among the incident light is thus eliminated outwardly (the brightness is made uniform), and the contrast ratio becomes close to 1. This is why the shadow becomes inconspicuous. The brightness is also made uniform all over the display surface in this case.

On the contrary, in case of a reflective liquid crystal display device having a reflector that mainly reflects light along the viewing axis of the user, that is, in case of a reflector satisfying the direct reflection requirement, the user watches the display surface with directly reflected light, so the light becomes brighter than the scattered light.

The reflected light in this case, however, is the light reflected in a single incident direction. Thus, the light is affected significantly by the contrast ratio of the incident direction, causing the shadow to appear clearly.

The present invention is directed to the fact that the shadow can be extinguished by setting the contrast ratio of the light incident direction to 1 or the shadow can be reduced by getting the contrast ratio closer to 1.

Next, a case in which eight gradation steps are displayed in monochrome will be discussed. Assume now that the light transmission ratio of the brightest gradation display is $T_1$, that is, producing a bright display. Hereafter, $T_2$, $T_3$, $T_4$, $T_5$, $T_6$, $T_7$, and $T_8$ (dark display) are assumed in order of brightness. The brightness of $T_1$ to $T_8$, for example, under an indoor light, is 30 nit, 27 nit, 23 nit, 19 nit, 14 nit, 10 nit, 7 nit, and 4 nit.

If the brightness of the shadow is brighter than $T_2$, a shadow will cause no gradation reverse in the gradation display. In this case, the contrast ratio of the light incident direction must be 1.1 or under (30 nit/27 nit). Actually, however, the brightness in the gradation display often results in a screen whose brightness is changed continuously. $T_8$ (dark display) is hardly adjacent to $T_2$.

Therefore, if the contrast ratio of the light incident direction is 2 or under, no video is reversed between $T_8$ and $T_5$, which is located at the middle in the eight gradation steps. ($T_5/T_6$=1.4, ($T_6/T_7$)=1.4, and ($T_7/T_8$)=1.75, that is, making the contrast ratio 2 or under, is a necessary condition to reduce the shadow.

On the other hand, a liquid crystal display device realizes a bright display and a dark display with an applied voltage to the liquid crystal layer, which changes the orientation of the liquid crystal layer. The contrast ratio increases with an increase of the orientation change. Thus, the contrast ratio becomes closer to 1 in the direction where the orientation change is less.

In this case, the problem is not the change of the apparent orientation, but the change of the optical characteristics caused by the change of orientation. The "apparent change" is one of the optical characteristic changes.

Assume now that the liquid crystal layer is sliced in parallel to both the upper and lower substrates. By applying a voltage, the most significant change of orientation appears in the center layer of the sliced layers, which is the farthest from the upper and lower substrates.

However, the center layer is least affected by the restriction of orientation caused by the orientation layers on the upper and lower substrates. Considering the change of orientation in the center, therefore, will mean considering all the liquid crystal layers.

Figure 20A:
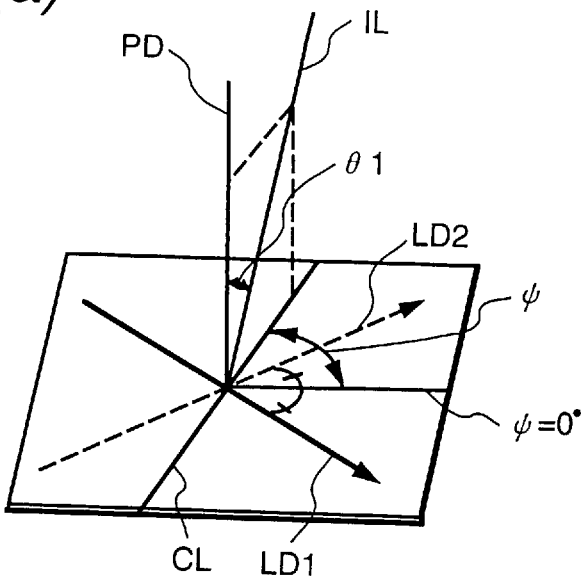
FIG. 20(a) and FIG. 20(b) are diagrams which show the definition of the an azimuth angle of liquid crystal cell and the user's azimuth angle for a liquid crystal display device, respectively.

FIG. 20(*a*) and FIG. 20(*b*) show the azimuth angle (ψ) of the liquid crystal cell and the user's azimuth angle (ψ1) for a liquid crystal display device (41). FIG. 20 (*a*) shows the azimuth angle (ψ) in a single liquid crystal cell.

As shown in the drawing, the direction which divides the angle between the orientation (LD1) on the upper substrate and the orientation (LD2) on the lower substrate into equal parts is defined as azimuth angle 0°, which is then assumed as the reference axis to determine the azimuth angle of the liquid crystal cells. The direction of azimuth angle 0° is also the axis of azimuth angle 0°. Then, the azimuth angle is defined in a direction counter-clockwise from the axis.

Furthermore, the direction of the light (IL) incident into the liquid crystal cells is defined by an angle formed by a crossing line (CL), on which the incident surface, including the axis of the light incident into the display surface of the liquid crystal cells and the display surface normal (PD), and the display surface cross, and the axis of the azimuth angle 0°.

Thus, the light incident at azimuth angle 60° is defined as the light incident in the direction of an azimuth angle 60° of the liquid crystal cells. of course, the incident angle of the light at this time is an angle formed by the incident light axis and the display surface normal. Hereafter, referring to an azimuth angle simply means the azimuth angle of the liquid crystal cells shown in FIG. 20(*a*).

In the center layer, only the rise angle of the liquid crystal molecular axis (angle formed by the substrate surface and the liquid crystal molecular axis) is changed with an applied voltage. When no voltage is applied, the rise angle is almost 0°. The angle is increased when a voltage is applied. The direction of the liquid crystal molecular axis is fixed whether a voltage is applied or not.

FIG. 20(*b*) illustrates the user's azimuth angle for a liquid crystal display device. Generally, when a liquid crystal display device is used, that is, when the operator panel of a liquid crystal display device is used, it is set horizontally.

As shown in the figure, the horizontal display surface 113 of the liquid crystal display device is thus defined both as to the horizontal direction for using the display and the direction of the user's azimuth angle 0°. This direction is a med as the reference for using the liquid crystal display. The direction is then defined counter-clockwise therefrom.

Furthermore, the direction of the light incident into the liquid crystal display device when in use is determined by the angle formed by an intersectional axis, on which the light incident surface, including the axis of the light incident into the display surface of the liquid crystal cells and the display surface normal, and the display surface cross, and the axis of the user's azimuth angle 0°.

For example, the light incident at a user's azimuth angle of 60° is defined as the light incident at the user's azimuth angle 60° to the horizontal direction when using the liquid crystal display device. The incident light angle at this time is an angle formed by the incident light axis and the display surface normal.

Generally, the light incident at the user's azimuth angle of 60° reflects in the direction of a user's azimuth angle of 240° (=60°+180° as shown in the figure. In this case, however, the light can also reflect at a user's azimuth angle of 270°, which is vertical to the liquid crystal display device while it is used. The reflection angle of the light is formed by the reflected light axis and the display surface normal.

While the liquid crystal display device is used in the general status, the main light comes in the direction of a user's azimuth angle of 90° to the display surface of the liquid crystal cells, that is, vertical to the liquid crystal display device while it is used. The light also reflects in the direction of a user's azimuth angle of 270°, which is vertical to the liquid crystal display device. If light reflects in the direction of the display surface normal, no user's azimuth angle is defined.

Figure 21:
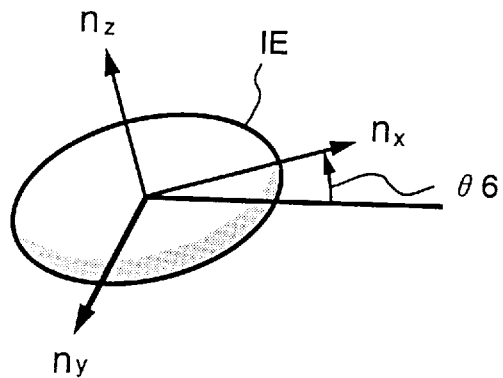
FIG. 21 is a diagram which shows an optical indicatrix.

Since the center layer is thin enough, it may be considered as a double refraction medium. FIG. 21 shows an optical indicatrix. The viewing angle characteristics of the double refraction medium optical characteristics can be described as shown below using the optical indicatrix shown in FIG. 21.

An optical indicatrix (IE) is an ellipse defined in a real space assuming a 3-axis refractivity. The axial direction is parallel to the optical principal axis of the double refraction medium. The length of the ellipse in each axial direction is a refractivity in the direction. Assume now that light is incident in a double refraction medium from the direction of ($x_0$, $y_0$, $z_0$).

The double refraction to be received by this light can be found by executing the following geometric operation for the optical indicatrix. A cross section including the center of the optical indicatrix and vertical to ($x_0$, $y_0$, $z_0$) is assumed. The cross section becomes an ellipse, but the difference between the long axis and the short axis of the ellipse is assumed as the double refraction received by the light incident in the direction of ($x_0$, $y_0$, $z_0$).

For a liquid crystal layer (that is, the center layer), the optical indicatrix looks like a rugby ball. The long axis of the optical indicatrix is parallel to the mean direction of the liquid crystal molecular axis. In the center layer, only the rise angle of the long axis of the optical indicatrix is changed.

Figure 22:
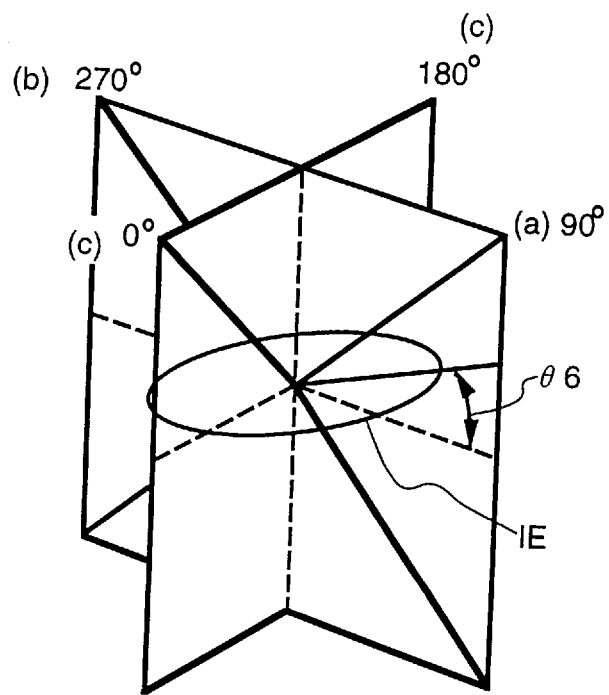
FIG. 22 is a diagram which shows 3 directions representing the change of a cross section of an optical indicatrix according to an applied voltage.

Next, the viewing angle dependence for changes of an optical indicatrix cross sectional form will be examined below. FIG. 22 shows 3 directions representing a change of an optical indicatrix cross sectional form when a voltage is applied to the form.

Attention to the three directions a, b, and c shown in the figure (a: the mean direction of the liquid crystal molecular axis in the center layer, b: opposite direction of a, and c: vertical direction of a).

Figure 23:
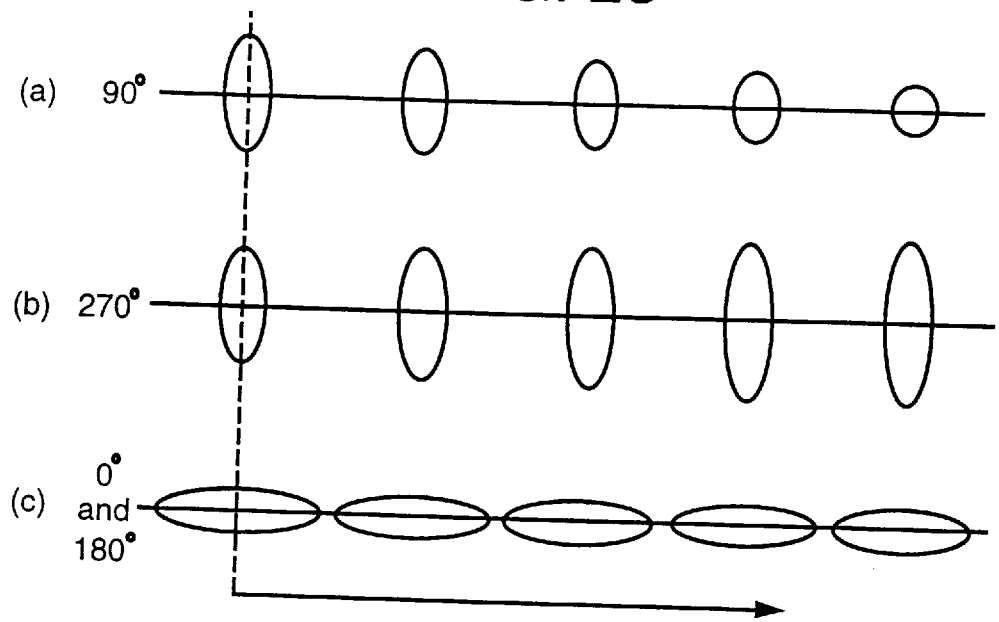
FIG. 23 is a diagram which shows the change of the cross section of an optical indicatrix caused by an applied voltage.

FIG. 23 shows a change of the cross section of an optical indicatrix, to be caused by an applied voltage.

As shown in lines (a) and (b) of FIG. 23, the cross sections of a and b are changed significantly with an applied voltage.

The cross sections of both a and b are ellipses when no voltage is applied. In case of a, the long axis shrinks to transform the cross section almost to a circle when a voltage is applied. In case of b, the long axis is extended to increase the ellipticity. On the contrary, the cross section of c is little changed as shown in line (c) of FIG. 23.

Thus, it is estimated that the optical characteristics of the liquid crystal layer is less in the direction vertical to the rise of the liquid crystal molecular axis in the center layer and the contrast ratio is close to 1 when a voltage is applied. If this direction is aligned to the light incident direction, therefore, the shadow can be reduced.

Furthermore, dark display and bright display can also be considered as a change of the polarization of the light passing the liquid crystal layer when a voltage is applied. It is considered that the contrast ratio becomes closer to 1 as the polarization change becomes small. The above consideration was examined as shown below by measuring the polarization.

The polarizations of the light passing the liquid crystal layer for bright display and dark display are assumed to be $E_B$ and $E_D$, and $E_B$ and $E_D$ are represented as $(S_{1B}, S_{2B}, S_{3B})$, $(S_{1D}, S_{2D}, S_{3D})$ using normalized stokes parameters $(S_1, S_2, S_3)$ defined in the following expressions:

$$S_1 = (E_X^2 - E_Y^2)/(E_X^2 + E_Y^2)$$

$$S_2 = 2E_X E_Y \cos\delta/(E_X^2 + E_Y^2)$$

$$S_3 = 2E_X E_Y \sin\delta/(E_X^2 + E_Y^2)$$

In the above expressions, $E_X$, $E_Y$, $\delta$ indicate the electric field vector in a given X axis direction, the electric field vector in a Y axis direction, and the phase difference between $E_X$ and $E_Y$, respectively. The polarization change to be caused by an applied voltage is defined as $\Delta$ and quantified in the following expression using $(S_{1B}, S_{2B}, S_{3B})$, where $(S_{1D}, S_{2D}, S_{3D})$ is a constant.

$$\Delta = C \times (1 - S_{1B}S_{1D} - S_{2B}S_{2D} - S_{3B}S_{3D})$$

The maximum value of $\Delta$ is 1. At this time, the polarization to be caused by an applied voltage becomes maximum. The minimum value is 0. At this time, no polarization change is recognized when a voltage is applied.

Figure 24:
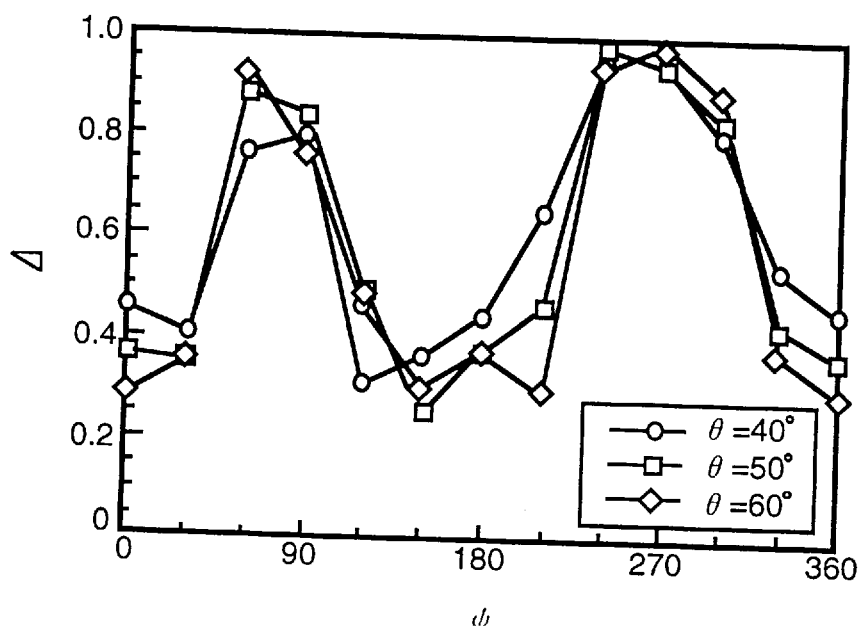
FIG. 24 is a diagram of the relationship between polarization (A) change and contrast ratio of a liquid crystal cell of the present invention.

FIG. 24 shows the relationship between the polarization change ($\Delta$) which occurs in the liquid crystal cells and the contrast ratio in the present invention. The horizontal axis in the figure is an azimuth angle of the liquid crystal cells defined in FIG. 20(a).

The vertical axis is a polarization change ($\Delta$). $\Delta$ indicates that the polarization change becomes almost 0 when the azimuth angle is 0° or 180°. The azimuth angle 0° or 180° is equal to the direction (c) shown in FIG. 22. Under those conditions, both the azimuth angle dependence and the incident angle dependence of the contrast ratio of the liquid crystal cell were measured.

Figure 25:
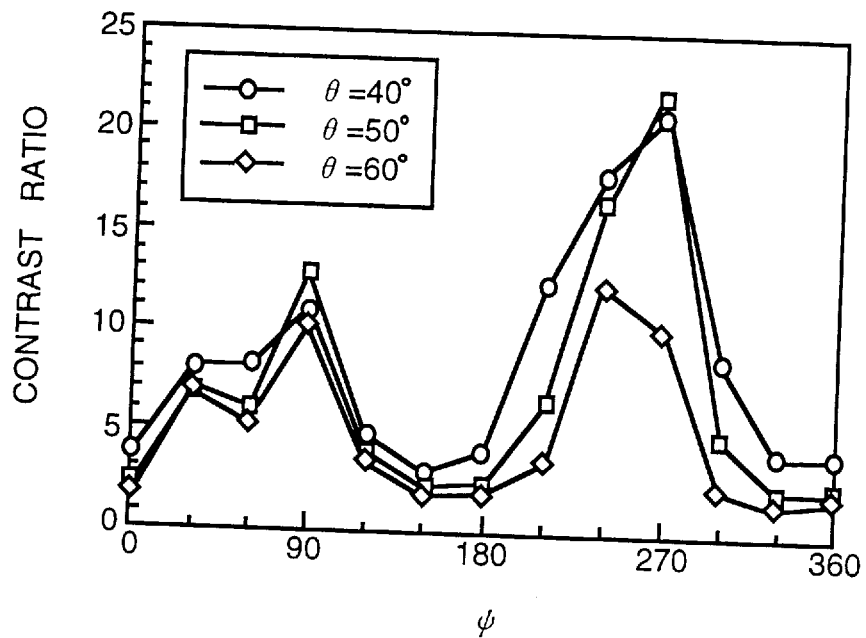
FIG. 25 is a diagram of the relationship between an azimuth angle and contrast ratio of the liquid crystal cell of the present invention.

FIG. 25 shows an embodiment for the relationship between an azimuth angle and the contrast ratio of the liquid crystal cells in accordance with the present invention. It also shows the viewing angle dependence of the liquid crystal cells. As shown in the figure, the contrast ratio becomes extremely small and becomes closest to 1 when the azimuth angle is 0° or 180° which is equal to the direction (c) in FIG. 22. This has proved experimentally that the above consideration is correct.

According to the above result, it has been proved that the shadow can be reduced if the liquid crystal display device is manufactured so that the liquid crystal cells have a viewing angle dependence that will allow the contrast ratio (light transmission ratio of dark display section to bright display section) for the light incident at the specified angle to become 2 or under at the specified azimuth angle and if the liquid crystal cell is arranged to align the direction of the specified azimuth angle of the liquid crystal cell to the direction of the light from the light source.

Next, the high luminance reflective color liquid crystal display device will be explained below.

Figure 26:
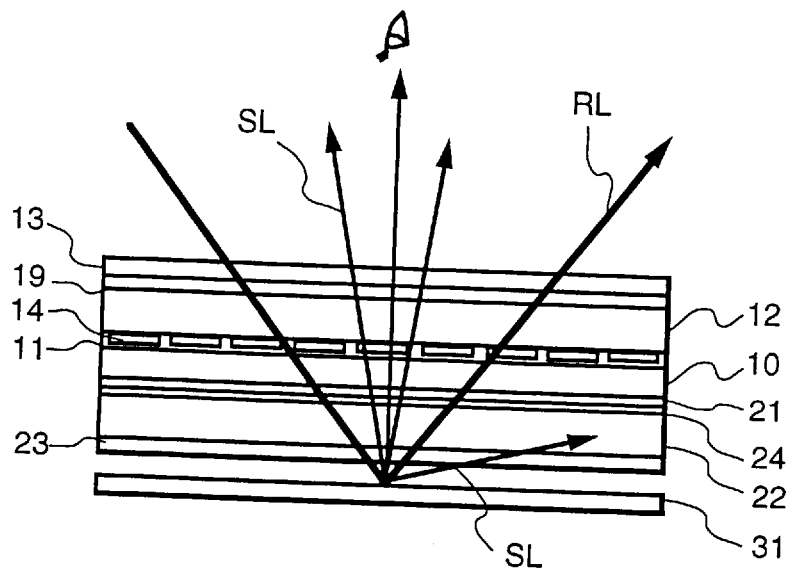
FIG. 26 is a cross section of a conventional monochromatic reflective liquid crystal display device.

FIG. 26 shows the cross section of a conventional monochromatic reflective liquid crystal display. There are two reasons why this liquid crystal display could not be a color type display; (i) insufficient reflection ratio and (ii) drop of the luminance by mixing of multiple light paths.

At first, the problem (i) will be explained. The light reflecting from a reflector is classified into directly reflected light (RL) with strong intensity and scattered light (SL) with weak intensity.

In directly reflected light, the incident angle and the reflection angle are equal to the macro-viewed reflection surface, but they are not equal in scattered light. The surface of a reflector has a fine irregularity, so it has many fine reflecting faces having various radial hooks. The distribution of such fine faces is reduced as the number of radial hooks are decreased.

Fine reflecting faces are mostly distributed on a reflection surface having no inclination (0°), that is, a reflection surface parallel to the macro-viewed reflection surface. Most of the light reflects directly on such a reflector.

As will be explained later, generally, the user watches a liquid crystal display device at a viewing angle of 0°. This is why the user watches scattered light with weak intensity as shown in FIG. 26 if a flat type reflector is used. In other words, if the reflection ratio is insufficient, no light is reflected directly.

In this case, the direct reflection requirement that leads the reflected light directly in the direction of the user's viewing axis is not satisfied. This is because the liquid crystal display is affected by the shadow significantly.

Figure 27:
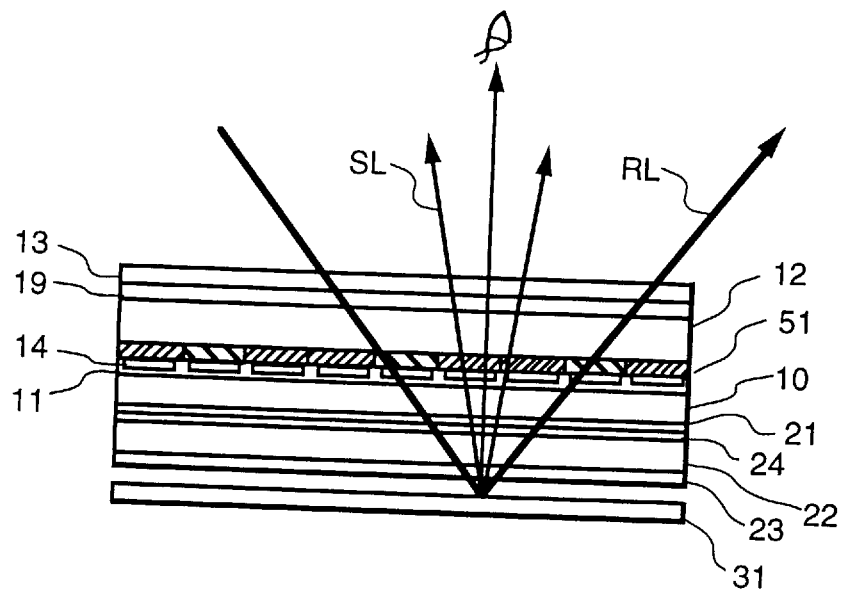
FIG. 27 is a cross section of a conventional color reflective liquid crystal display device.

Next, the problem (ii) will be explained. FIG. 27 shows the cross section of a conventional reflective color liquid crystal display. Using the figure, the construction of a reflective liquid crystal display device equipped with a color filter and exhibiting a drop in luminance caused by the liquid crystal display device will be explained. A color filter 51 is formed between the liquid crystal layer 10 and one of the upper and lower substrates 12 and 22.

In the embodiment shown in FIG. 27, the filter is formed close to the upper substrate 12. In case of a reflective liquid crystal display device equipped with a reflector 31 under the lower substrate 22, the lower substrate 22 is formed between the color filter 51 and the reflector 31 to separate them. At this time, the color filter 51 is 100 $\mu$m in thickness, while the lower substrate 22 is about 1 mm in thickness. So, the light path differs between the incident light and the reflected light.

In other words, a "problem that incident light and reflected light pass different color filters" occurs. If light passes through different color filters, the transmission spectra also differ. So, light is absorbed completely by different color filters (for example, red and blue color filters). The reason why the luminance drops so much when the light passes different color filters is that the light must pass the thick lower substrate.

In case of problem (i), the reflection ratio can be improved by leading the reflected light directly in the direction of the user's viewing axis using a reflector provided to solve the direct reflection problem.

In case of problem (ii), a reflector is provided above the lower substrate, close to the liquid crystal layer to prevent the light from passing the lower substrate. This can solve the above stated problem to be caused by passing of the light through different color filters.

In case of a monochromatic display, any of the methods can be adopted independently to improve the luminance. In case of a color display, however, none of the methods can assume enough luminance for a color display, because a color filter shows the color by absorbing the light, which causes the luminance to drop up to ⅓ or under after the light passes a color filter only once.

To realize a color display by solving both problems (i) and (ii) simultaneously, the construction of the present invention must be assumed. Furthermore, even when the direct reflection requirement is satisfied, the construction of the present invention must also be assumed to solve the shadow problem. Hereafter, some embodiments of the present invention will be explained by referring to the drawings.

[Embodiment 1]

Figure 1:
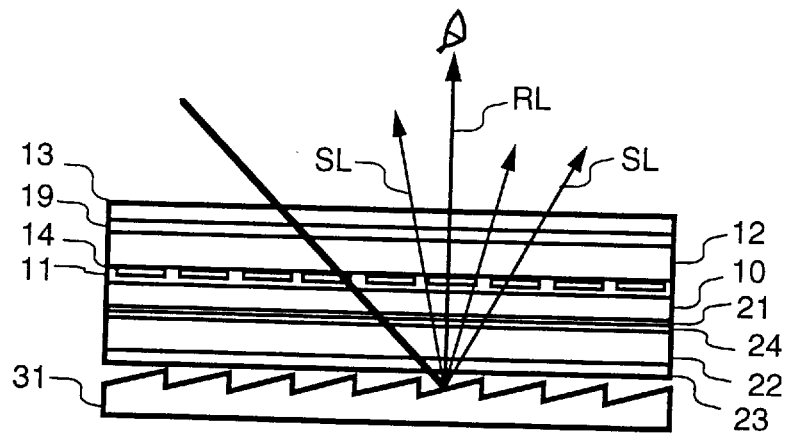
FIG. 1 is a diagram which shows the cross section of a liquid crystal display device forming an embodiment of the present invention.

FIG. 1 shows the cross section of a liquid crystal display device forming an embodiment of the present invention.

The construction of the liquid crystal display device is shown in FIG. 1, wherein a cell is formed, from a display surface, of elements which are laminated in order of an upper polarizer 13, a phase plate 19, an upper substrate 12, an upper electrode 14, an upper orientation layer 11, a liquid crystal layer 10, a lower orientation layer 21, a lower electrode 24, a lower substrate 22, a lower polarizer 23, and a reflector 31. Each electrode is connected to a driving circuit. The reflector 31 is under the lower substrate 22, on the opposite side of the display surface.

Each substrate is made of glass. Each electrode comprises ITO, 1000 Å in thickness, 310 μm in width, and arranged in pitches of 20 μm. Each orientation layer is made of polyimide polymer molecules and treated with a rubbing method for forming the orientation layer on the treating conditions; a notching of 0.4 mm, a rotation speed of 1000 rpm, and a feeding speed of 33 m/s.

The pre-tilt angle was 4° and the twisting angle was 240°. The liquid crystal layer comprises nematic liquid crystal and chiral agent. The layer is 5.7 μm in thickness and the liquid crystal material is MJ63928 (Melk Corporation). The Δn is 0.145 and the Δnd is 0.83 μm. The chiral agent is S811 (Melk Corporation) and the content ratio is 0.9% (weight %).

The light incident axis angle to the lower polarizer was set to 90° and the light incident axis angle to the upper polarizer was set to an azimuth angle of 20°. A phase plate was formed between the upper polarizer and the upper substrate, and the delay axis angle was set to an azimuth angle of 50° and the Δnd in the 550 nm wavelength was set to 0.63 μm.

The direction for orientation treatment was determined according to the way to manufacture the upper and lower substrates. The contrast ratio viewing angle dependence of the liquid crystal display is as shown in FIG. 25. The figure indicates that the contrast ratio becomes almost 1 at around the azimuth angle of 0° of the liquid crystal cell.

The liquid crystal cell whose contrast ratio becomes almost 1 with respect to the light incident at the azimuth angle 0° is used to manufacture the liquid crystal display device so that the direction of the azimuth angle (degrees) of the liquid crystal cell may be aligned to the direction of the user's azimuth angle of 90° to the display surface of the liquid crystal cell.

Figure 4:
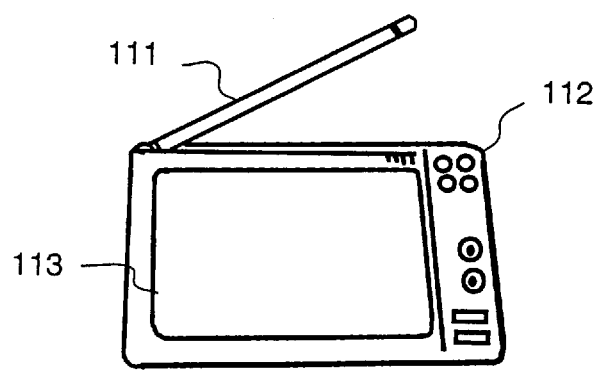
FIG. 4 is a front view of a portable information terminal on which the liquid crystal display device of the present invention is mounted.

FIG. 4 shows the front view of a portable information terminal using the liquid crystal display device of the present invention. The figure shows the external view of the liquid crystal display device mounted on a portable information terminal. The liquid crystal display device comprises an antenna 111, an operation panel 112, and a display panel 113.

FIG. 5 shows the definition of the light incident angle ($\Theta 1$), the user's viewing angle ($\Theta 2$), and the tilt angle ($\Theta 3$) of the liquid crystal display. The definition will be explained with reference to an embodiment of a liquid crystal display used for a lap-top personal computer.

An incident angle is formed by the axis of the light incoming from the source and the surface normal of the liquid crystal display device. In the figure, clockwise turning is defined as positive (+).

A viewing angle is formed by a viewing axis, which is the direction of the user's eyes, and the display surface normal. In the figure, counter-clockwise turning is defined as positive (+).

A tilt angle shows an inclination of the display surface of the liquid crystal display to the surface normal of the desk on which the liquid crystal display device is supported during use. Clockwise turning is defined as positive (+).

The user uses a portable information terminal outdoors most frequently with a tilt angle of about 20° and a viewing angle of about 20°. Generally, the direction of the incident light at this time is a user's azimuth angle of 90°. This is why the liquid crystal display device of the present invention is manufactured by aligning the direction of the azimuth angle of 0° of liquid crystal cell to the direction of the user's azimuth angle of 90°. In this case, the incident angle of the sunlight, which is the main light source, is about 20°.

To reflect the main incident light from an outdoor light source in the direction of viewing axis directly, that is, to satisfy the direct reflection requirement, the light incident at about 20° must reflect in the direction of about 20° viewing angle.

Since both the viewing angle and the incident angle are 20°, a flat reflector whose reflection surface is parallel to the display surface is used to lead the directly reflected light in the visual axis direction.

The display characteristics of this portable information terminal was measured outdoors. The luminance of the bright display section near the dark display section was 56 cd/m² and the luminance of the bright display section far away from the dark display section was 80 cd/m². The section-section ratio was 1.4. This ratio indicates the degrees of the dark display section.

In other words, this means that if this ratio is 1, no shadow appears, and the larger this ratio becomes, the more the shadow becomes conspicuous. It was also proved that shadow was inconspicuous and the visibility was very good.

As explained above, since the direction of direct reflected incident light is aligned to the direction of the user's viewing axis, the light from the source (sun) can be used effectively to obtain a bright display.

Furthermore, since the direction in which the azimuth angle of the liquid crystal cell whose contrast ratio becomes almost 1 at an azimuth angle of 0° is aligned to the user's azimuth angle of 90°, which is the direction of the incident light, a reflective liquid crystal display device with inconspicuous shadow and with excellent visibility is obtained.

[Embodiment 2]

In this embodiment 2, the liquid crystal display device in embodiment 1 is mounted on a lap-top personal computer and is used under indoor light. FIG. 6 shows an oblique view of the lap-top personal computer on which the liquid crystal display device of the present invention is mounted.

The user puts the lap-top personal computer shown in the figure on a desk and uses it under an indoor light at a tilt angle of 30° and a viewing angle of 0°.

Even when the liquid crystal display device is used indoors in such a way, the incident light direction is generally equal to the user's azimuth angle of 90°. The main light from the source (lighting) had an incident angle of 50°. Hereafter, the features of the tilt angle, viewing angle, and incident angle will be explained below.

An investigation was carried out for the tilt angle and the viewing angle of 10 persons using a reflective liquid crystal display device. FIG. 7 shows the measurement results of the tilt angle and the viewing angle during actual use of the liquid crystal display device. As shown in the figure, most of the subjects used the display device at a tilt angle of about 30° and a visual angle of ±10°.

Generally, it is well known that the main incident light in offices has an angle in a range between 30° to 60°. To reflect the incident light from such a source in an office in the viewing axis direction directly, that is, to satisfy the direct reflection requirement, the light incident at an angle of 30° to 60°} must reflect at a viewing angle of ±10°.

In this embodiment 2, this measurement result indicates that the reflective liquid crystal display device should be manufactured by aligning the direction of the azimuth angle at which the contrast ratio becomes closest to 1 to the light incident at angle of 30° to 60° to the direction of the light incident at the user's azimuth angle of 90° to the display surface of liquid crystal cell.

Generally, (incident angle+reflection angle)=(incident angle 30° to 60°)+viewing angle (±10°)=max. 70° to min. 20° is assumed.

Since the reflection surface tilt angle for direct reflection is (incident angle+reflection angle)/2, the reflection surface tilt angle for direct reflection is 10° to 35°. This indicates that a reflector having a reflection surface tilt angle within this range should be combined with the liquid crystal cell having an azimuth angle at which the contrast ratio becomes closest to 1.

The general use status of the display device has been discussed above. In case of a special use status, for example, when a patient lying on a bed in a hospital uses a liquid crystal display device, both the incoming light direction and the visual axis direction are at a user's azimuth angle of 0°, although the liquid crystal display device itself is set horizontally.

In this case, the direction of the azimuth angle of 0° of the liquid crystal cells whose contrast ratio becomes almost 1 at an azimuth angle of 0° is aligned to the direction of the user's azimuth angle of 0°, which is the main incident light direction.

In other words, the direction of the required azimuth angle is aligned to the horizontal direction of the reflective liquid crystal display device. In this way, the incident light angle, the user's azimuth angle, and the viewing axis direction will be varied depending on the manner in which the liquid crystal display device is used.

Therefore, the reflective liquid crystal display device of the present invention to be manufactured by considering how the display will be used, by manufacturing a liquid crystal cell having a viewing angle dependence which will result in contrast ratio closest to 1 at the required azimuth angle to the light incident at the required angle, and by arranging the liquid crystal cell so that the direction of the required azimuth angle may be aligned to the direction of the light incident from the main source while the display device is used.

This typical embodiment is the reflective liquid crystal display device used at the user's azimuth angle of 90° or in the horizontal direction with respect to the display surface of the liquid crystal display device.

In this embodiment 2, the reflector surface normal was inclined by 10° in the direction of the display surface normal. Hereafter, the inclination from the reflector surface normal to the display surface normal is defined as a reflector surface tilt angle.

In this case, therefore, the reflector surface tilt angle becomes 10°. The cross section of the reflector is just like that shown in FIG. 10(*b*), which will be explained later. The reflector was manufactured as described below.

Figure 8:
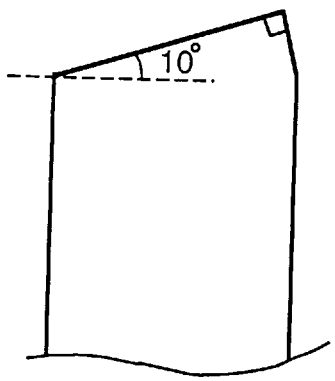
FIG. 8 is a diagram which shows the shape of the bite in an embodiment used for manufacturing a reflector of the present invention.

FIG. 8 shows the shape of a bite in an embodiment used for manufacturing reflectors. As shown in the figure, the tilt angle at the tip of the bite was 10°. A brass plate was cut into a mold using this bite.

To prevent the mold shape from being worn and becoming irregular, the bite was ground every 300 cuttings. An acrylic resin plate was heated to above the glass transformation point and the mold wad was pressed against the acrylic resin plate for embossing finish. Then, 1000 Å-thick aluminum was evaporated on the plate to make the reflector.

A lap-top personal computer on which this liquid crystal display device is mounted was used under light of 580 lx indoors. This light condition was also set in other embodiments. The luminance of the bright display section near the dark display section was 35 cd/m$^2$ and the luminance of the bright display section far away from the dark display section was 53 cd/m$^2$. The section-section contrast ratio was 1.5. The shadow was not so apparent and the visibility was good.

As explained above, a reflective liquid crystal display device with less shadow and excellent visibility, when used under a light just above the user in an office, was obtained by setting the reflector surface tilt angle to 10°.

Thus, the light from the source may reflect in the direction of the viewing axis approximately and by aligning the direction of the azimuth angle of 0° of the liquid crystal cell whose contrast ratio becomes almost 1 at an azimuth angle of 0° to the light incident at an angle of 30° to 60° to the user's azimuth angle of 90°.

[Embodiment 3]

In this embodiment 3, the reflector surface tilt angle of the liquid crystal display device in embodiment 2 was set to 25°, so that the main light incident from the source may reflect directly in the direction of the viewing axis, that is, so that the direct reflection requirement may be satisfied.

The luminance of the bright display section near the dark display section was 75 cd/m$^2$ and the luminance of the bright display section far away from the dark display section was 57 cd/m$^2$. The section-section contrast ratio was 1.3. The shadow was not so apparent and the visibility was good.

The reflector surface tilt angle was set to 25° to directly reflect the incident light more efficiently in the direction of the viewing axis and align the direction in which the contrast ratio becomes almost 1 to the direction of the light incident from the source to obtain a reflective liquid crystal display device with less shadow and with high luminance and excellent visibility.

[Embodiment 4]

In this embodiment 4, the liquid crystal display device in embodiment 3 is provided with a phase plate whose three axes have a different refraction ratio from each other in size of $n_X$, $n_Y$, $n_Z$. The $n_X$ had to be in the mean direction of the liquid crystal molecular axis in this case. The liquid crystal display in embodiment 3 used a phase plate of $n_X$=1.5864, $n_Y$=1.5829, and $n_Z$=1.5820. The relationship of $n_X$ and $n_Z$, in size was $n_X$>$n_Z$.

On the contrary, in case of the phase plate in this embodiment, $n_X$=1.5848, $n_Y$=1.5798, and $n_Z$=1.5843 are assumed. In the phase plates in embodiments 3 and 4, $n_X$ and $n_Z$ are almost equal and the relationship of size is $n_X > n_Z$. The $n_Y$ size differs between the embodiments.

The retardation in the direction of the phase plate plane normal takes the same value in both embodiments. The next figure shows the visual angle dependence for the contrast ratio of the liquid crystal display device in this embodiment 4.

Figure 9:
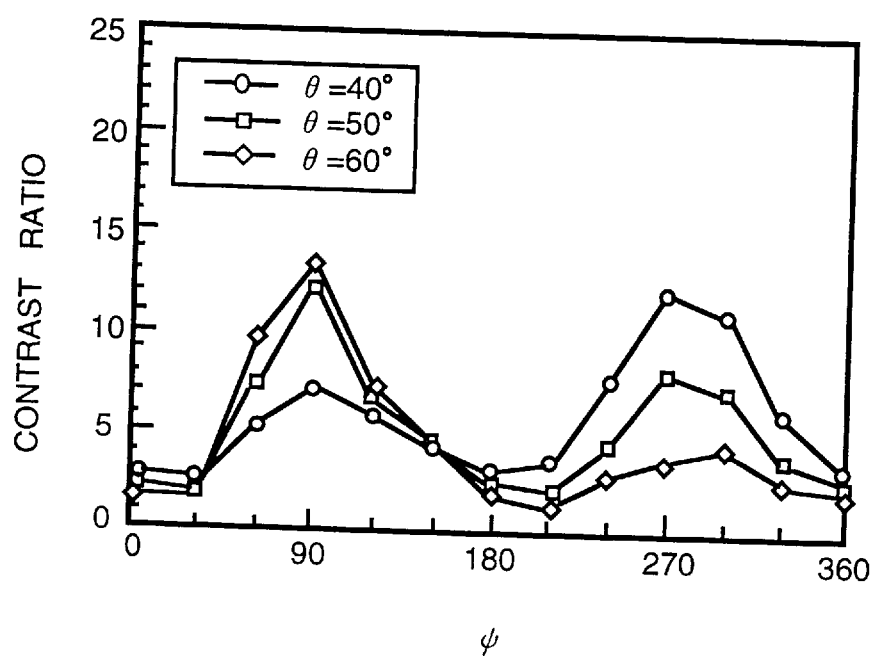
FIG. 9 is a diagram which shows the relationship between an azimuth angle and contrast ratio of the liquid crystal cell of the present invention.

FIG. 9 shows another example of the relationship between an azimuth angle and contrast ratio of the liquid crystal cell of the present invention. In case of the liquid crystal cell in embodiment 4, an extremely small contrast ratio is obtained when the azimuth angle is of 0° and 180°.

In case of the liquid crystal display device in embodiment 4, the luminance of the bright display section near the dark display section was 60 cd/m² and the luminance of the bright display section far away from the dark display section was 46 cd/m². The section-section contrast ratio was 1.3. The shadow was not so apparent and the visibility was good.

As explained above, even when a phase plate having different sizes of $n_X$, $n_Y$, and $n_Z$ is used, if the direction of the light incident is aligned to the mean direction of the liquid crystal molecular axis in the center layer of the liquid crystal layer, a reflective liquid crystal display device with less shadow and with high luminance and excellent visibility was obtained.

[Embodiment 5]

In this embodiment 5, the liquid crystal display device in embodiment 3 is provided with a reflector on which two types of reflection surfaces inclined at 10° and 20° tilt angles are arranged alternately.

The luminance of the bright display section near the dark display section was 60 cd/m² and the luminance of the bright display section far away from the dark display section was 83 cd/m². The section-section contrast ratio was 1.4. The shadow was not so apparent and the visibility was good.

Since two types of reflection surfaces, each of which has a tilt angle different from the other, are arranged on the reflector, the reflector can use the light from plural lighting sources attached on the ceiling effectively, providing a reflective liquid crystal display device with high luminance and excellent visibility.

[Embodiment 6]

In this embodiment 6, the liquid crystal display device in embodiment 3 is provided with a reflector on which two types of reflection surfaces inclined at 15° and 25° tilt angles are arranged alternately. The reflection surface tilt angles were determined on the basis of the following factors.

Of plural light sources attached on the ceiling of an office, the incident angles of two light sources emitting strong light were measured. The result was 30° and 50°. The tilt angles were obtained by dividing these incident angles and the visual angle of 0° (display surface normal) by two equally. In other words, a nearer and stronger incident light is reflected directly in the direction of the visual axis.

The luminance of the bright display section near the dark display section was 65 cd/m² and the luminance of the bright display section far away from the dark display section was 89 cd/m². The section-section contrast ratio was 1.4. The shadow was not so apparent and the visibility was good.

Since two types of reflection surfaces, each of which has a tilt angle different from the other, are arranged on the reflector and each reflection surface tilt angle is set so that the light from the two light sources nearer to the liquid crystal display device and emitting more strongly can reflect directly in the direction of the visual axis, the reflector can use the light from plural light sources attached on the ceiling effectively to provide a reflective liquid crystal display device with high luminance and excellent visibility. Of course, more than two light sources may be used in this case.

[Embodiment 7]

In this embodiment 7, the liquid crystal display in embodiment 6 is provided with a reflector which is embossed using a die whose surface is corroded for fine irregularity to increase the scattering of light.

FIG. 1 will be used here again for explaining this feature. If the reflector 31 has a mirror surface, it will reflect the surrounding scenes and the user's face. This will prevent the user from concentrating on the display device. An embodiment has been introduced to solve such a problem, using a method to scatter the light in one of the processes as the light passes through the liquid crystal display.

If the light is scattered, the surrounding scenes and the user's face reflecting on the display surface become vague and inconspicuous, so that the user can concentrate on the display device. While the light passes the upper polarizer 13 and the lower polarizer 23, however, the light polarization must be kept. Thus, the light must be scattered in another process.

Concretely, a light scattering layer is formed between the lower polarizer 23 and the reflector 31, not between the upper polarizer 13 and the lower polarizer 23. Furthermore, the surface of the reflector 31 is roughed to form a light scattering layer.

The luminance of the bright display section near the dark display section was 60 cd/m² and the luminance of the bright display section far away from the dark display section was 95 cd/m². The section-section contrast ratio was 1.6. The shadow was not so apparent and the visibility was good.

Indoor light is not a point light source. The light incident angle is distributed. The light from plural sources can be used effectively at every incident angle by increasing the light scattering characteristics of the reflector. Furthermore, since sudden changes of the luminance on the surface are likely to be caused by viewing angle changes, a reflective liquid crystal display device with high luminance and excellent visibility can be obtained.

Fine irregularity on the reflector surface can also be formed not only by corrosion, but also by sand blasting or grinding using a rough surface. In addition, acid corrosion, sand blasting, or grinding using a rough surface may be applied to the resin plate before treatment by aluminum evaporation. Acid corrosion, sand blasting, or grinding using a rough surface may also be applied to an aluminum-evaporated reflecting surface.

The light scattering layer may be a plastic film with a fine rough surface or with a distribution of refractivities. The plastic film may also be put between the lower polarizer 23 and the reflector 31 or stuck on the surface of the reflector 31.

[Embodiment 8]

In this embodiment 8, the liquid crystal display device in embodiment 3 is provided with a reflector on which fine heights and recesses are arranged at pitches of 30 μm, which is less than 1/10 of a pixel in size. When observing the display from various viewing axes, no moire was generated and the visibility was very good. Moire refers to a pattern of geometrical stripes just like a cloth mark.

The cross sectional form of the reflector of this invention is, for example, as shown in FIG. 10(a) to FIG. 10(i). The reflector shown in the drawing has a reflection surface, which is not parallel to the display surface. To make the reflection factor of the reflector uniform apparently, the size of the roughness on the reflection surface must be minimized as much as possible. Concretely, if the distance between adjacent heights on the reflection surface of the reflector is defined as a pitch, the pitch must be at the largest less than a pixel.

Furthermore, if the pixel size and the recess/height size are overlapped periodically, moire occurs. If moire occurs, the display becomes uneven, causing the visibility to drop.

In addition, moire is changed significantly according to the change of the viewing axis. In this case, the visibility is lost significantly. Irregularity of the pitches on the reflector surface will be effective to prevent such problems as moire. In other words, the pitch should be less than one pixel. It may be less than ⅕ of one pixel in size.

[Embodiment 9]

In this embodiment 9, the liquid crystal display device in embodiment 3 is provided with a reflector, part of the surface of which is curved. When using a liquid crystal display device, it is always desirable for the change of the display status caused by the change of the user's viewing axis to be minimized.

In the liquid crystal display device of the present invention, a high luminance display is possible if the viewing axis is opposite to the direct reflection of the incident light. If the viewing axis is shifted even slightly, however, the luminance is reduced suddenly. If the change of display status caused by the change of viewing axis is large, therefore, the use of the liquid crystal display device will be restricted.

Generally, to minimize the change of reflection characteristics caused by the change of viewing axis, a method to provide the ordinary reflector with a light scattering function is adopted.

In case of a liquid crystal display device having only one polarizer, however, a problem arises from this light scattering function. To avoid this, a method to curve the reflection surface is also used. FIG. 10(g) to FIG. 10(i) show the cross section of such a reflector.

Figure 11:
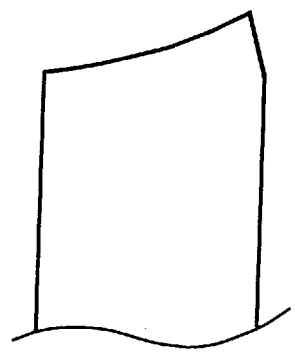
FIG. 11 is a diagram which shows the shape of the bite in an embodiment, used for manufacturing a reflector of the present invention.

FIG. 11 shows the shape of the bite used for manufacturing reflectors having a curved surface.

A reflector having a curved surface can be manufactured by cutting a metallic plate (brass, etc.) using, for example, a bite whose cross section is curved as shown in FIG. 11 to make dies used for embossing acrylic resin, etc. and evaporating metal such as aluminum, etc. on the surface.

Figure 12:
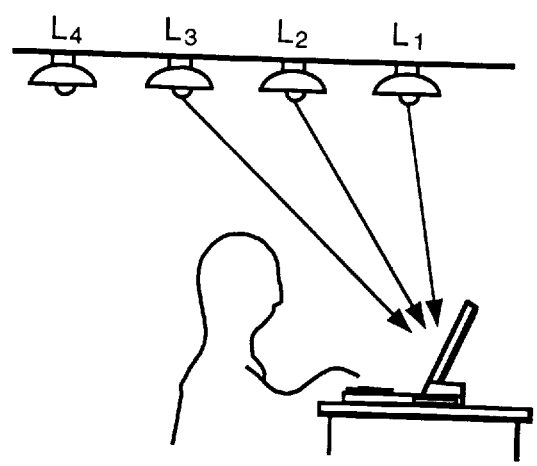
FIG. 12 is a diagram which shows how a liquid crystal display device is used in an office.

FIG. 12 shows how a liquid crystal display is used in an office. It also shows the directions of the light from plural sources attached on the ceiling, coming into the reflective liquid crystal display while in use. In the office, plural lighting sources are arrayed at spaced positions (L1, L2, L3, . . . ) on the ceiling. If those sources are all used as light, the luminance of the display surface can be further improved.

Figure 13:
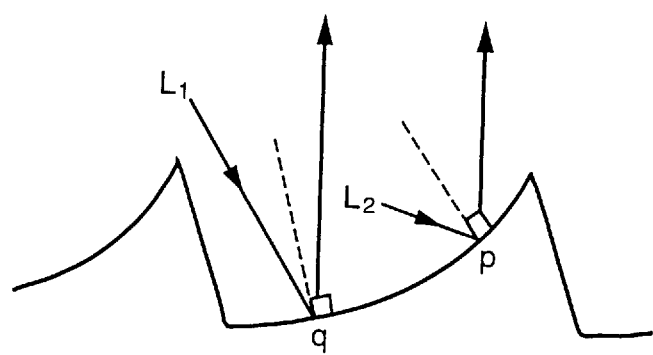
FIG. 13 is a cross section indicating the reflecting characteristics of a reflector whose surface is curved partially.
Figure 14:
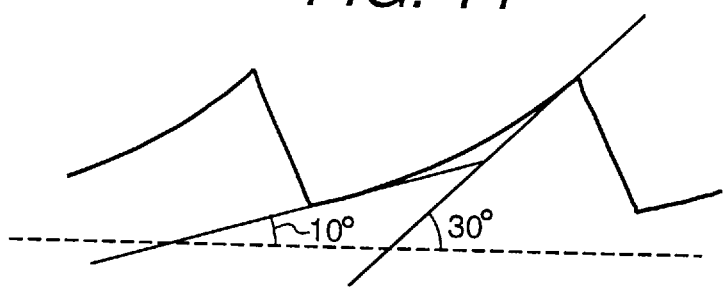
FIG. 14 is a cross section of the reflector shown in FIG. 10(g)
Figure 15A:
FIG. 15(a)–FIG. 15(d) are diagrams which show how to manufacture the reflector of the present invention.
Figure 15B:
Figure 15C:
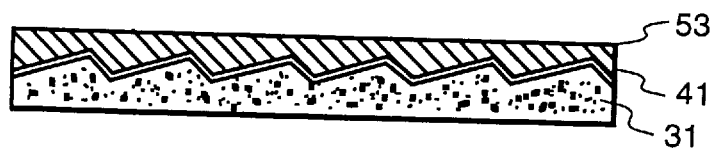
Figure 15D:
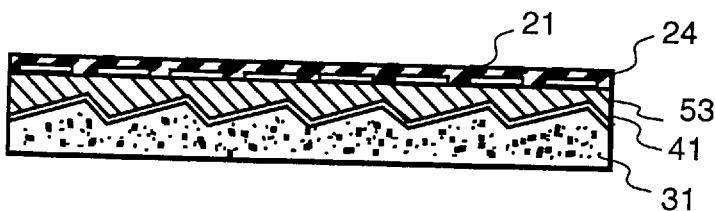

Furthermore, if part of the reflection surface is curved, the light from those plural sources can be directed to the user. FIG. 13 shows the cross section and the reflection characteristics of the reflector, wherein part of the reflection surface is curved.

Tn other words, a reflector having a curved surface as shown in the figure, around the point p where the reflection surface normal divides the L1 direction and the user's direction into two equal parts, the L1 light is directed to the user. In the same way, around the point q where the reflection surface normal divides the L2 direction and the user's direction into two equal parts, the L2 light is directed to the user.

In this embodiment 9, part of the reflector surface is curved. The cross section of the reflector is the same as that shown in FIG. 10(g). The broken axis in the figure shows the top view of the reflector in the macro view. The reflector surface is tilted at 30° at one end and 10° at the other end of the curved part. For example, it is assumed that there are plural light sources emitting light within the range of 60° and 20°.

The reflector was manufactured as follows: A brass plate was cut using a bite having a curved surface at its tip as shown in FIG. 11. The curved surface shown in FIG. 11 is close to an ellipse in shape. Cutting tools with a radius of 100 μm and a radius of 50 μm were used. The bite was ground every 200 cuttings to prevent its reflection surface from deformation by wear. Hereafter, the brass plate was used as dies just like in embodiment 2 to emboss a heated acrylic resin plate. Then, aluminum was evaporated on the resin plate to 2000 Å in thickness.

The luminance of the bright display section near the dark display section was 51 cd/m$^2$ and the luminance of the bright display section far away from the dark display section was 69 cd/M$^2$. The section-section contrast ratio was 1.35. The shadow was not so apparent and the visibility was good.

Part of the reflector surface was curved, and reflection surface tilt angles were distributed so that the angle formed by the direction of the light incident from plural light sources closer to the liquid crystal display device and stronger in intensity and the direction of the viewing axis is divided into two equal parts.

Furthermore, the light from plural sources were reflected directly in the direction of the viewing axis or reflected on conditions closer to this one, so that the light from those light sources can be used effectively to provide a reflective liquid crystal display device with high luminance and excellent visibility.

[Embodiment 10]

In this embodiment 10, the liquid crystal display device is provided with a plate manufactured by bonding the reflector 31 and the lower substrate 22 using epoxy resin. The refractivity of the epoxy resin was about 1.5. Thus, the tilt angle of the reflector had to be 17° to reflect the light incident at an angle of 50° directly in the direction of the viewing axis, taking the light refraction caused by the epoxy resin into account. In this embodiment, the reflector was obtained in such a way instead of that used in the other embodiment to obtain the tilt angle of 17°.

The luminance of the bright display section near the dark display section was 74 cd/m$^2$ and the luminance of the bright display section far away from the dark display section was 60 cd/m$^2$. The section-section contrast ratio was 1.2. The shadow was not so apparent and the visibility was good.

It was proved that the methods can obtain a reflective liquid crystal display device with almost the same display characteristics as those of the liquid crystal display device in embodiment 3 if the tilt angle of the reflection surface is set to the required value taking the refractivity of epoxy resin into account even when the reflector 31 and the lower substrate 22 are united using epoxy resin as explained above.

Reduction of the passing light intensity can be prevented if resin or other similar material whose refractivity is equal to that of the lower polarizer 23 is charged between the lower polarizer 23 and the reflector 31.

[Embodiment 11]

In this embodiment 11, the liquid crystal display device will be as described in the following. It is also the same as the liquid crystal display device provided by the other embodiments.

Figure 2:
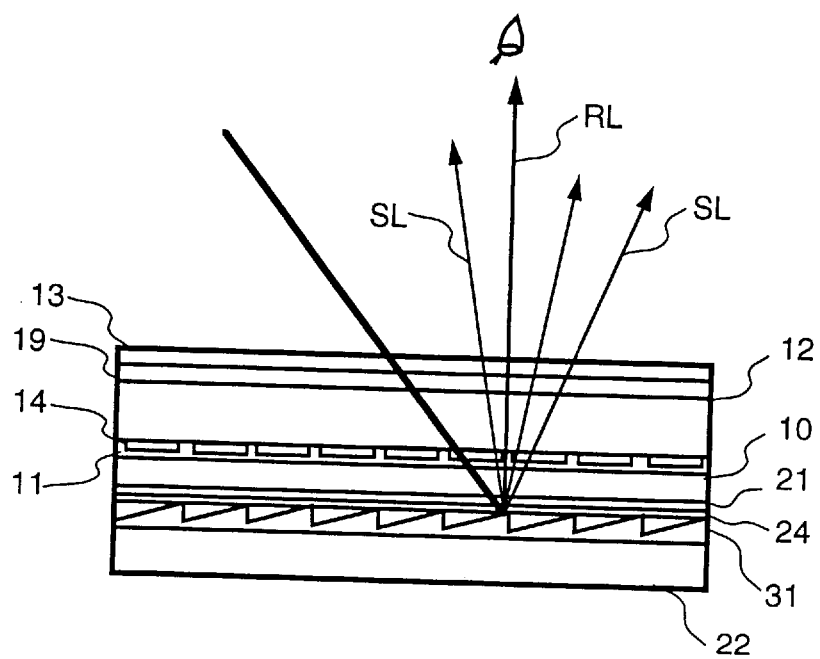
FIG. 2 is a diagram which shows the cross section of a liquid crystal display device forming another embodiment of the present invention.

FIG. 2 shows the cross section of a liquid crystal display device in another embodiment. The liquid crystal display device shown in FIG. 2 comprises the following items laminated in order from a display surface: an upper polarizer 13, a phase plate 19, an upper substrate 12, an upper electrode 14, an upper orientation layer 11, a liquid crystal layer 10, a lower orientation layer 21, a lower electrode 24, a reflector 31, and a lower substrate 22.

Unlike the liquid crystal display device shown in FIG. 1, in this liquid crystal display device, the lower polarizer 23 is omitted, the reflector 31 is put on the lower substrate 22, and the positions of the reflector 31 and the lower substrate 22 are changed. Furthermore, the reflector 31 and the lower substrate 22 are generally united into one element. Thus, the lower substrate 22 may not be made of glass. Other items, that is, the materials and manufacturing methods are the same as those in embodiment 1.

The reflector having a reflection surface and united with the lower substrate is manufactured as follows.

FIG. 15(a) to FIG. 15(d) show a process for manufacturing a reflector of the present invention.

How to manufacture the reflector will be explained below. A substrate is cut out of glass material into the reflector 31 (FIG. 15 (a)) with the same shape as that shown in FIG. 10(b). The reflection surface tilt angle is 20° and the pitch of the peaks and recesses on the reflector is 20 $\mu$m. At this time, the peaks of the rough surface of the reflector becomes 4 $\mu$m in height.

Then, aluminum is evaporated on the surface of the reflector 31 to 1000 Å in thickness to form a reflecting layer 41 (FIG. 15 (b)). This surface is smoothed by forming an epoxy resin smooth layer 53 to a thickness of 20$\mu$m on the reflecting layer 41. After this, the surface of the epoxy resin layer is polished to smooth it (FIG. 15(c)). Finally, the lower electrode 24 and the lower orientation layer 21 are formed as shown in (FIG. 15(d)).

Figure 10A:
FIG. 10(a)–FIG. 10(i) are cross-sections of a reflector whose surface is not parallel to the display surface.
Figure 10B:
Figure 10C:
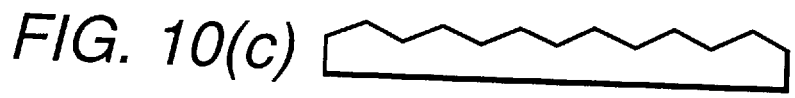
Figure 10D:
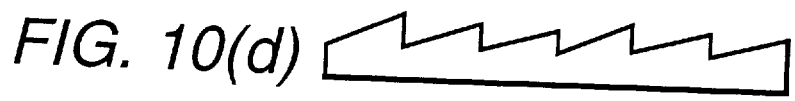
Figure 10E:
Figure 10F:
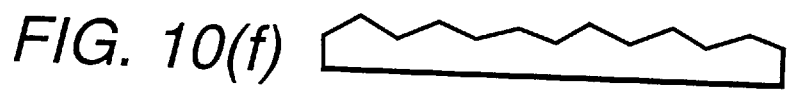
Figure 10G:
Figure 10H:
Figure 10I:
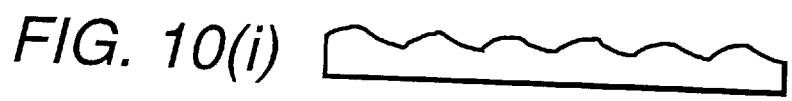

The reflector may have any of the shapes of a diffraction grating, pyramid, etc. in cross section, as shown in FIG. 10(a) to (c). In this embodiment 11, the substrate forming a reflector need not pass light, so a material can be selected widely in addition to glass. Since there is no need to cut such a hard material as glass, it will be easier to manufacture.

The liquid crystal display device in embodiment 11 was mounted on a lap-top personal computer and used under indoor light. The user put the liquid crystal display device on a desk and used it most frequently at a tilt angle of about 30° and a viewing angle of 0°. In this case, the light from the light source was incident into the display device at an angle of about 40°.

In the reflector incorporated liquid crystal display device shown in FIG. 2, the luminance of the bright display section near the dark display section was 60 cd/m$^2$ and the luminance of the bright display section far away from the dark display section was 61 cd/m$^2$. The section-section contrast ratio was 1.0. No dark display shadow was recognized. The luminance in the dark display section was 9 cd/m$^2$ and the contrast ratio was 7.

As explained, since the reflector was incorporated in the liquid crystal cell and the incident light was reflected directly in the direction of the viewing axis at a reflection surface tilt angle of 20°, a reflective liquid crystal display device with excellent visibility was obtained. No shadow was recognized and the contrast ratio was high.

[Embodiment 12]

In this embodiment 12, the liquid crystal display device uses a reflector provided with a reflection surface tilt angle of 20° and is manufactured using a simple method. FIG. 16(a)–FIG. 16(e) show another example for manufacturing a reflector of the present invention. The simple method for manufacturing the reflector will be explained first.

Figure 16A:
FIG. 16(a)–FIG. 16(e) are diagrams which show how to manufacture a reflector of the present invention.

At first, a resin layer is formed on the lower substrate 22 using an acrylic resin (FIG. 16(a)). The layer is heated and embossed using dies to manufacture a reflector 31 whose shape is just as shown in embodiment 11 (FIG. 16(b)). Then, aluminum is evaporated on the surface to form a reflection layer 41 (FIG. 16(c)).

Figure 16B:
Figure 16C:
Figure 16D:
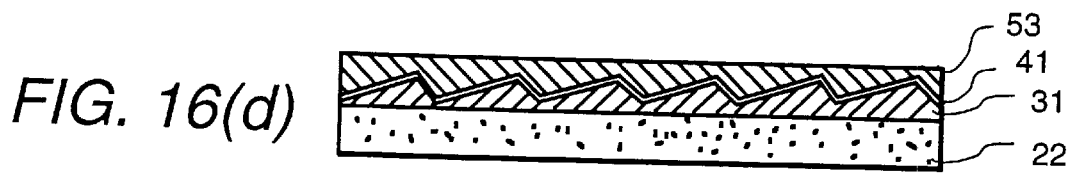
Figure 16E:
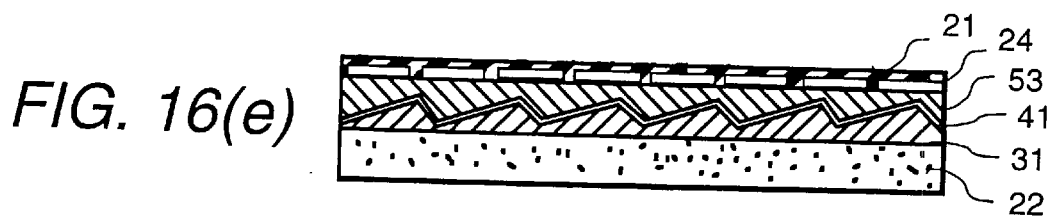

Hereafter, a smooth layer 53 is formed to eliminate heights and recesses (FIG. 16(d)) and the lower electrode 24 and the lower orientation film 21 are formed (FIG. 16(e)) just like in FIG. 15. In FIG. 16(b), embossing for producing a finish may be replaced with a cutting operation.

The manufacturing method is applied when both the lower substrate 22 and the upper substrate 12 in embodiment 11 are used as they are. Just like the manufacturing method shown in FIG. 15, there is no need to cut the lower substrate 22 made of a hard material such as glass, so it is easy to manufacture the reflector 31. And, just like in embodiment 11, a reflective liquid crystal display device having excellent visibility and high contrast ratio, and with no shadow can be obtained.

[Embodiment 13]

In this embodiment 13, the liquid crystal display device shown in embodiment 12 uses a reflector provided with two types of reflection surfaces having 15° and 25° tilt angles, arranged alternately on the reflector manufactured using a simple method. It is adopted instead of the reflector having a surface tilting angle of 20° introduced in embodiment 12.

The luminance of the bright display section near the dark display section was 55 cd/m$^2$ and the luminance of the bright display section far away from the dark display section was 55 cd/m$^2$. The section-section contrast ratio was 1.0. No dark display shadow was recognized. The luminance in the dark display section was 8 cd/m$^2$ and the contrast ratio was 7.

As explained above, since the reflector was incorporated in the liquid crystal cell and two types of reflection surfaces having a tilt angle different from each other are arranged alternately, and the two incident lights were reflected directly in the direction of the user's viewing axis approximately, a reflective liquid crystal display device with excellent visibility was obtained. No shadow was recognized and the contrast ratio was high.

[Embodiment 14]

In this embodiment 14, the liquid crystal display device shown in embodiment 12 uses a reflector, part of which is curved, manufactured with a simple method and provided with a reflection surface tilt angle of 20°. Dies with the same shape as that in embodiment 9 were used for embossing the surface for obtaining the required finish.

The luminance of the bright display section near the dark display section was 52 cd/m$^2$ and the luminance of the bright display section far away from the dark display section was 52 cd/m$^2$. No shadow was recognized. The luminance in the dark display section was 7 cd/m$^2$ and the contrast ratio was 7.

A reflector, part of which was curved, was incorporated in the liquid crystal, and the reflection surface tilt angle was distributed so that an angle obtained by dividing the angle formed by the direction of the light incident from two sources closer to the liquid crystal display device and the direction of viewing axis into two equal parts may be included.

Since the light from two sources were reflected directly to the user's viewing axis or reflected on conditions close to that, the light from the two sources on the ceiling could be used effectively to provide a reflective liquid crystal display device with high luminance and excellent visibility.

[Embodiment 15]

Figure 3:
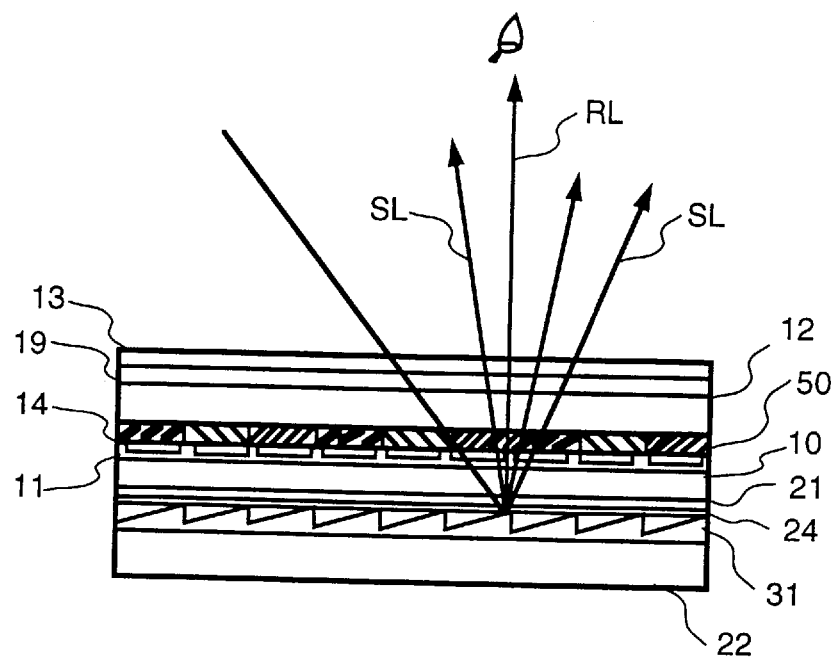
FIG. 3 is a diagram which shows the cross section of a liquid crystal display device forming a further embodiment of the present invention.

FIG. 3 shows the cross section of another example of liquid crystal display device of the present invention. In the construction shown in FIG. 3, a color filter is added to the construction shown in FIG. 2.

In this embodiment 15, the reflector 31 having a reflection surface tilted at 20° is formed on the lower substrate 22. In other words, the lower polarizer 23 is eliminated, and the positions of the reflector 31 and the lower substrate 22 are changed just like in embodiment 11.

In such a liquid crystal display device, a color filter 51 is formed between the upper substrate 12 and the liquid crystal layer 10.

The luminance of the bright display section was 30 cd/m$^2$ and the luminance of the dark display section was 4 cd/m$^2$. The section-section contrast ratio was 7. The bright (white) display luminance and the contrast ratio were enough. The visibility was also very good.

As explained above, since the lower polarizer 23 was eliminated, and the reflector 31 was formed on the lower substrate 22, the light from a source did not permeate the lower substrate 22. Thus, the problem that occurs when incident light and reflected light pass different color filters was solved. Furthermore, since the reflector having a reflection surface tilt angle of 20° was incorporated in the liquid crystal cell to satisfy the direct reflection requirement, light absorption of the color filters was compensated by increased luminance to provide a bright reflective color liquid crystal display device with excellent visibility. The color filter 51 may also be put between the lower substrate 22 and the liquid crystal layer 10. In other words, it was clear that the same effect will be obtained even when the color filter 51 is put anywhere between the upper substrate 12 and the reflector 31.

In the construction of the liquid crystal display device of embodiment 15, light is always absorbed twice if it passes two color filters twice even when the filters have the same color. In order to increase the luminance, therefore, the transmission spectrum of the color filter itself should be increased. The following figure shows an example of such a color filter transmission spectrum.

Figure 17:
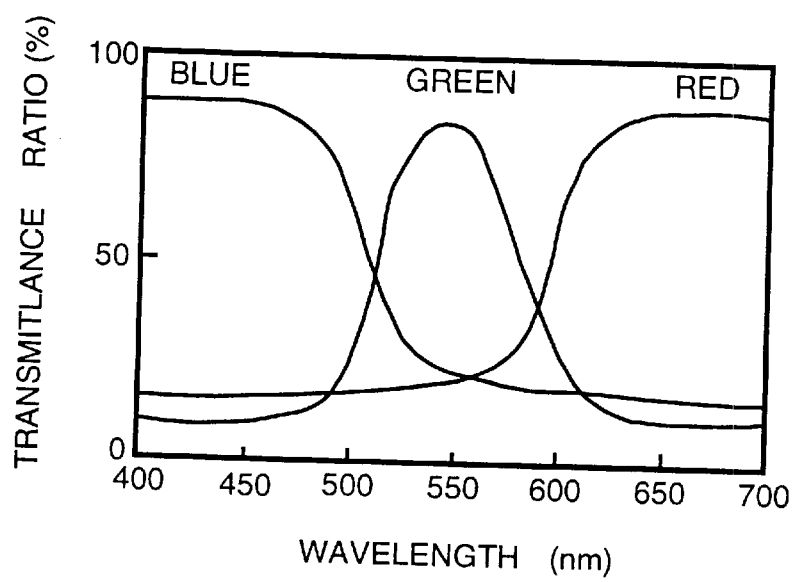
FIG. 17 is a diagram of an example of the transmission spectrum of red, green, and blue color filters with high transmission ratio.

FIG. 17 shows an example of transmission spectrum of red, green, and blue filters, whose transmission ratios are high. The transmission ratio of any of those red, green, and blue filters is 10% or over in every visible wavelength range.

[Embodiment 16]

In this embodiment 16, the liquid crystal display device shown in embodiment 15 uses a reflector whose curved reflection surface is formed like a semi-circle. The bite for manufacturing dies was manufactured first with only one cutting operation using a semi-circle-like cutting bite with a radius of 80 μm.

The luminance of the bright display section near the dark display section was 49 cd/m$^2$ and the luminance of the bright display section far away from the dark display section was 68 cd/m$^2$. The section-section contrast ratio was 1.39. The shadow was inconspicuous and the visibility of the liquid crystal display device was very good.

The luminance of the bright (white) display section was 25 cd/m$^2$ and the luminance of the dark display section was 4 cd/m$^2$. The section-section contrast ratio was 7. The bright display luminance and the contrast ratio were enough.

To manufacture a reflector whose reflection surface is curved, a bite whose cross section is a curve as shown in FIG. 11 must be manufactured at first. The curved surface will be manufactured easily if a rotating machine such as a lathe is used.

In this case, however, the cross section of the curved surface to be machined at one time will become part of an arc. As shown in embodiment 16, if the reflector whose curved surface is a single semi-circle in shape, the manufacturing will become very easy.

Furthermore, since the reflection surface is curved like a semi-circle, it is very easy to manufacture a bite for manufacturing dies and grinding the bite again for cutting the brass plate.

Figure 18:
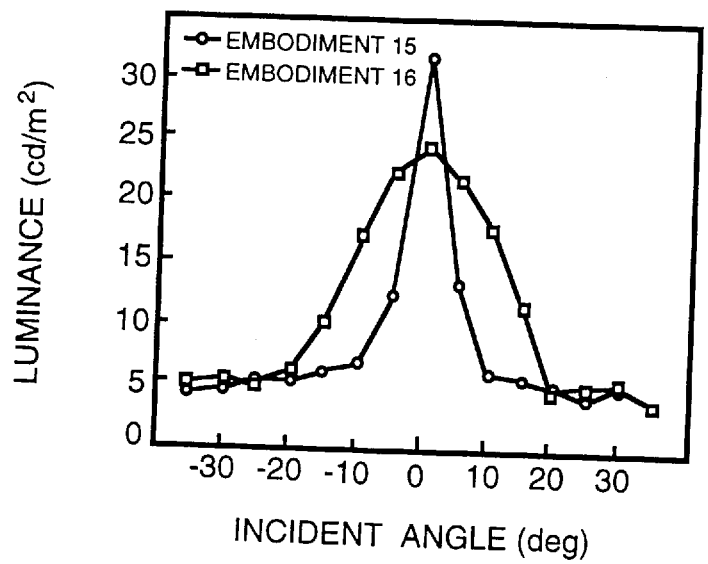
FIG. 18 is a diagram of the bright display visual angle characteristics of the liquid crystal display device introduced in embodiments 15 and 16.

On the other hand, FIG. 18 shows the visual angle characteristics of the bright display of the liquid crystal display device shown in embodiments 15 and 16. The figure also shows the relationship (angle dependency) between the luminance of the bright display surface and the light incident angle.

Figure 20B:
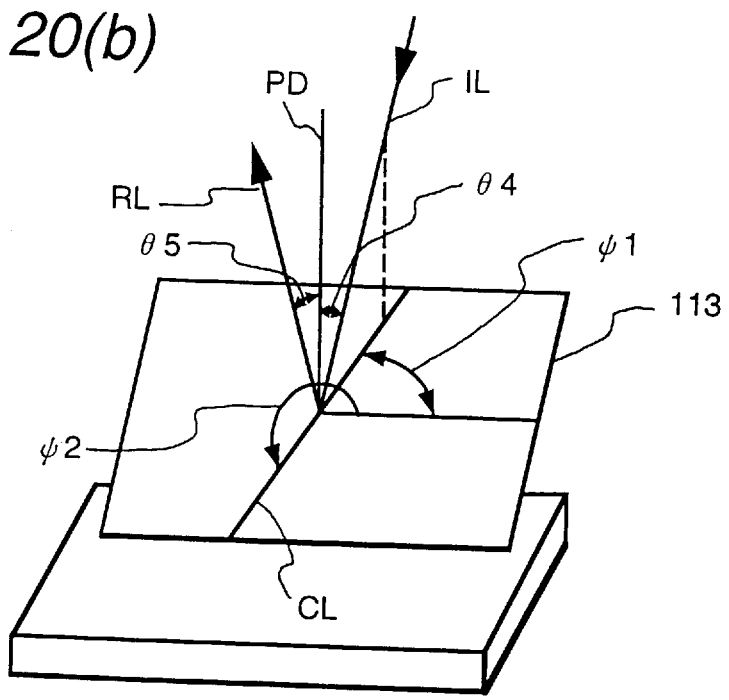

In the figure, the horizontal axis indicates the light incident angle defined in FIG. 20(b). The azimuth angle is 90° or 270° as defined in FIG. 20(b). In embodiment 15, high luminance was obtained only around an incident angle of 0°, and at other incident angles, the luminance was reduced sharply.

In case of the liquid crystal display device introduced in embodiment 16, high luminance was obtained at up to around an incident angle of 15°. Even when the user's visual axis was changed, the luminance in the bright display section was not reduced so much. The visibility was very good, since high luminance display was assured even when the user changed his posture.

Next, polarization and non-polarization of a liquid crystal cell including a polarizer shown in FIG. 2 and FIG. 3 will be explained for explaining the reason why every reflector used in embodiments 11 through 16 is provided with a mirror surface.

Generally, a liquid crystal display device uses a liquid crystal layer to receive polarized light and modulates the polarization by applying a voltage on the liquid crystal layer. Thus, light passes a polarizer twice while incident into and reflecting from the liquid crystal display device. The natural light passing the polarizer for the 1st time is polarized light.

If the light passing the polarizer for the second time is also polarized light, the light transmission ratio is changed with a voltage applied to distinguish bright display from dark display.

If the light passing the polarizer for the second time is non-polarized light (natural light, scattered light, and the like), however, the light transmission ratio is not changed by applying a voltage. As a result, no difference appears between a bright display and a dark display.

If polarization is eliminated and non-polarized light comes in while the light passes the polarizer for the first and second times for any reason, the difference in the light transmission ratio between a bright display and a dark display is reduced.

In case of the liquid crystal display devices shown in FIG. 2 and FIG. 3, the light reflects on the reflection surface while it passes the upper polarizer 13 for the first time for incident light and it passes the plate for the second time for outgoing light. So, if the reflection surface is rough, scattered light reflected at various angles is mixed with the polarized light, so that the light becomes non-polarized light.

In order to maintain polarization after reflection, the reflection surface should be a flat completely. This is the reason why the reflector of the reflecting type liquid crystal display device provided with only one polarizer should be flat completely. [Comparison Example 1]

In this comparison example 1, the liquid crystal display was manufactured using the components provided in embodiment 1 and having the viewing dependence of the contrast ratio shown in FIG. 25 so that the contrast ratio may become the maximum for light incident at an azimuth angle of 90°. In other words, the direction of an azimuth angle of 0° is aligned to the horizontal direction of the liquid crystal display device when in use.

Others are completely the same as those in embodiment 1, including a flat type reflector whose reflection surface is disposed in parallel to the display surface.

A portable information terminal on which the above liquid crystal display device was mounted was used outdoors. The luminance of the bright display section near the dark display section was 17 cd/m$^2$ and the luminance of the bright display section far away from the dark display section was 73 cd/m$^2$. The section-section contrast ratio was 4.3. The shadow was conspicuous and the visibility of the liquid crystal display was not good.

As explained above, it was proven that using a flat reflector, that is, aligning the direction of the reflection surface normal to the direction of the display surface normal, and setting the direction between the incident light axis and the viewing axis were not enough to reduce the shadow and obtain good visibility.

To obtain inconspicuous shadow and good visibility, the main incident light should be taken in selectively so that the direction of an azimuth angle of 0° of the liquid crystal cell having a viewing angle dependence with which the contrast ratio becomes closer to 1 may be vertical to the liquid crystal display device when in use. This means that the direction of an azimuth angle of 0° may be aligned to the direction of the incident light.

[comparison Example 2]

In this comparison 2, the reflection surface tilt angle of the reflector in embodiment 2 is set to −20°, and the liquid crystal display was set so that the direction of the reflection surface normal did not extend between the incident light axis and the user's viewing axis.

This liquid crystal display device was mounted in a lap-top personal computer and used under indoor light. The luminance of the bright display section near the dark display section was 3 cd/m$^2$ and the luminance of the bright display section far away from the dark display section was 16 cd/m$^2$. The section-section contrast ratio was 5.3. The whole screen was dark, the shadow was conspicuous and the visibility of the liquid crystal display was not good.

As explained above, it was proven that aligning the direction of the incident light to the direction of the required azimuth angle to obtain a contrast ratio closer to 1 is not enough to improve the luminance of display and obtain good visibility.

To reduce the shadow and obtain high luminance and good visibility, the incident light should be in the direction of the azimuth angle that produces a contrast ratio closer to 1, and the reflection surface tilt angle should be set so that the reflection surface normal may extend between the incident axis and the user's viewing axis to satisfy the direct reflection requirement as much as possible.

[Comparison Example 3]

In this comparison 3, the reflection surface tilt angle of the reflector in embodiment 6 is set to −25° and −10°, and the liquid crystal display device was set so that the direction of the reflection surface normal may not extend between the incident light axis and the user's viewing axis.

This liquid crystal display device was mounted in a lap-top personal computer and used under indoor light. The luminance of the bright display section near the dark display section was 3.1 cd/m$^2$ and the luminance of the bright display section far away from the dark display section was 15 cd/m$^2$. The section-section contrast ratio was 4.8. The whole screen was dark, the shadow was conspicuous and the visibility of the liquid crystal display was not good.

As explained above, it was proven that if the liquid crystal display device is set so that the direction of the reflection surface normal does not extend between the incident light and the user's visual axis, that is, if the direct reflection requirement is not satisfied, even when the incident light is in the direction of the beating angle that produces contrast ratio closer to 1, it is not enough to obtain high luminance and good visibility. To reduce the shadow and obtain high luminance and good visibility, the direct reflection requirement seems to be very important.

[Comparison Example 4]

This comparison 4 picks up the liquid crystal display device in embodiment 3, wherein a color filter 51 is formed between the upper substrate 12 and the liquid crystal layer 10.

This liquid crystal display device was mounted in a lap-top personal computer and used under indoor lighting. The luminance of the bright display section was 3 cd/m$^2$ and the luminance of the dark display section was 2 cd/m$^2$. The section-section contrast ratio was under 2.

In other words, the luminance was reduced sharply and the whole screen looked black as coal, although the reflection surface tilting angle was set to 25° and the direct reflection requirement was satisfied.

It was proven that just forming a color filter 51 between the upper substrate 12 and the liquid crystal layer 10 was not sufficient for color display of a reflective liquid crystal display device.

In other words, tilting the reflector surface to satisfy the direct reflection requirement was not enough to solve the problem that incident light and reflected light pass different color filters, and so, such arrangement is not enough for a reflective color liquid crystal display device.

[Comparison Example 5]

This comparison example 5 picks up the liquid crystal display introduced in embodiment 15, wherein the reflector 31 is eliminated, and a flat reflector is formed on the lower substrate 22. The flat reflector was manufactured as follows. Aluminum was evaporated directly on the lower substrate 22, then an epoxy resin layer was formed thereon as an insulation layer, 2 $\mu$m in thickness. Furthermore, the lower electrode 24 and the lower orientation film 21 were formed on that.

This liquid crystal display device was mounted in a lap-top personal computer and used under indoor lighting. The luminance of the bright display section was 12 cd/M$^2$ and the luminance of the dark display section was 7 cd/M$^2$. The section-section contrast ratio was under 2.

Since the lower polarizer 23 was eliminated and the lower substrate 22 was formed under the reflector 31, the problem that incident light and reflected light pass different color filters was solved. However, since the reflector was flat, the direct reflection requirement was not satisfied. The luminance and the contrast ratio were low and the visibility was very bad.

It was proven that not only should the reflector be incorporated in the liquid crystal cell, but also the direct reflection requirement should be satisfied and the light source should be selected properly (that is, taking in the main source light) for color display of a reflective liquid crystal display device.

According to the present invention, shadow and low luminance that have been pending problems in conventional reflective liquid crystal display devices are solved and a reflective liquid crystal display device with excellent visibility can be obtained.

Especially, the present invention is very effective to obtain a reflective liquid crystal display device that can realize a high luminance color display.

Another reflective liquid crystal display device according to the invention will now be specifically described hereinbelow by reference to further embodiments.

Figure 28:
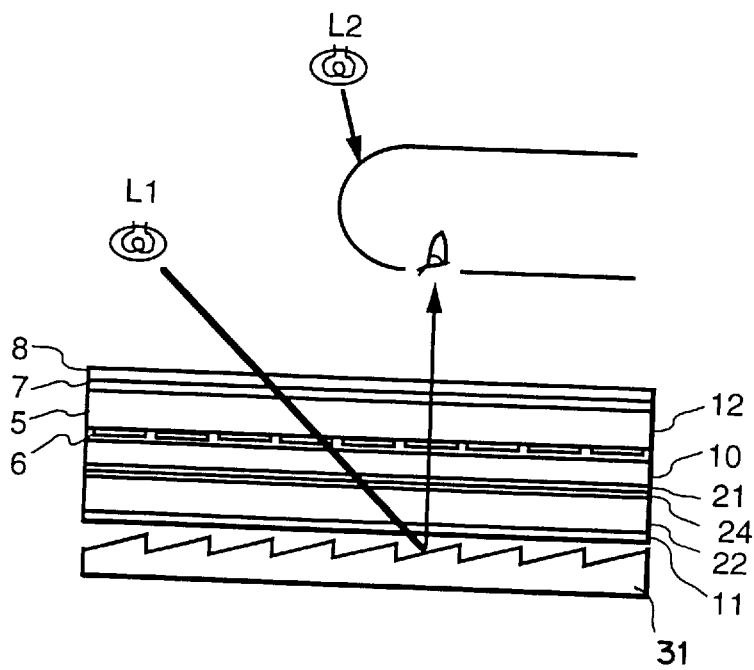
FIG. 28 is a sectional view showing an example of a reflective liquid crystal display device using a directional reflector.

The embodiments of the invention described hereinbelow have a construction as shown in FIG. 28 and the following will be described on the basis of the construction of FIG. 28.

[Embodiment 17]

Soda glass is used for the upper transparent substrate 12 and the lower transparent substrate 22. Matrix electrodes each comprising ITO are formed as the upper electrode 5 and the lower electrode 24 on the substrates 12 and 22. The width of each of the electrodes is equal to 0.3 mm, an electrode interval is equal to 0.03 mm and the thickness is equal to 1000 Å. The number of scanning lines is equal to 480 and the number of signal lines is equal to 640.

The orientation layers 6 and 10 on the substrates are made of polyimide polymer, are baked at a temperature of 200° C., subjected to an orientating process by a rubbing method on conditions that the cutting amount is equal to 0.4 mm, the rotational speed is equal to 1000 rpm, and the feed speed is equal to 33 m/sec, and after that, an aging process is executed at a temperature of 150° C. Consequently, the pre-tilt angle is equal to 4° and the twist angle is equal to 240°.

The liquid crystal layer 21 is made of a mixture of a nematic liquid crystal and a chiral dopant. MJ63928 (trade name) manufactured by Merck Japan Ltd. is used as a liquid crystal material and Δn in a bulk state is equal to 0.145. S811 (trade name) manufactured by Merck Japan Ltd. is used as chiral dopant agent and the content in weight % is equal to 0.9%.

By changing the thickness, liquid crystal elements of which the Δnd (the product of a birefringence Δn of the liquid crystal material in the bulk state and the thickness d of the liquid crystal layer) are equal to 0.755 μm, 0.812 μm, 0.843 μm, and 0.858 μm, respectively, are manufactured.

The phase plate 7, polarizers 8 and 11, and directional reflector are combined to each of the liquid crystal elements, thereby forming the reflective liquid crystal display device.

G1225DU (trade name) manufactured by Nitto Denko Co. is used for the upper and lower polarizers and a polycarbonate phase plate manufactured by Nitto Denko Co. is used for the phase plate.

Although the blaze shaped reflector as mentioned above is used as a directional reflector, when such a directional reflector is used in this case, if the reflector is a perfect flat surface, the user looks at an image of the light source. A portion where the image of the light source is seen has very high brightness and the other portion has low brightness, so that a brightness variation occurs on the picture screen.

Figure 29:
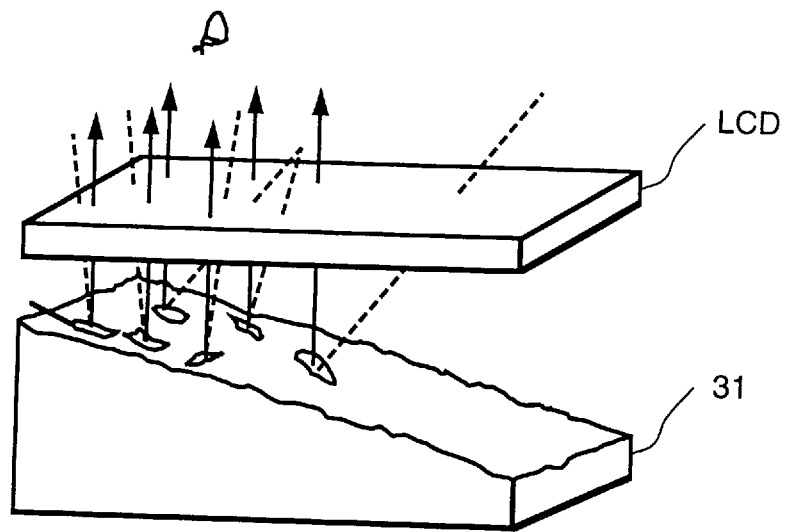
FIG. 29 is an enlarged explanatory diagram showing an example of a reflection surface of the directional reflector according to the present invention.

In order to obtain an even and bright display screen in the embodiment, a reflector in which convex and concave portions are provided for each of the reflection surfaces, thereby forming a number of fine reflection surfaces on the reflection surface, as shown in FIG. 29, can be also used.

Since angles of the fine reflection surfaces are different, light entering from different directions is regularly reflected toward the user as shown by the broken lines. Consequently, the image of the light source loses it outline and is evenly spread on the screen, thereby obtaining an even display with high brightness.

Such a reflective liquid crystal display device operates in a display method of a positive contrast type in which a shade display is performed on a higher voltage side among two or more applied voltages.

When the optical conditions of the phase plate and the polarizer are optimized in order to satisfy characteristics of the colorlessness, high transmission ratio and high contrast ratio in the positive contrast type display method, the number of combinations of the optical conditions of the phase plate and the polarizer is an enormous number and it takes an enormous amount of time for an optimization by trial and error.

In the embodiment, therefore, the optical conditions are optimized in consideration of the display principles of the liquid crystal display device.

Figure 34:
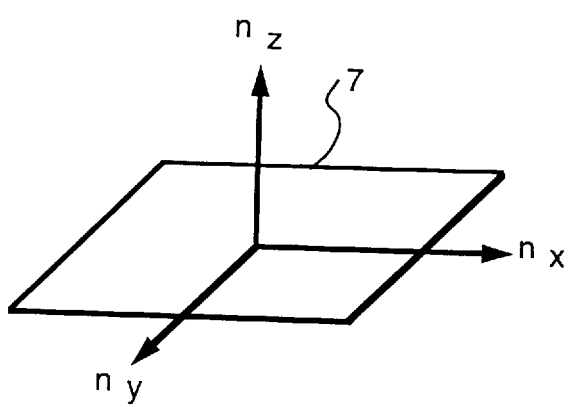
FIG. 34 is an explanatory diagram showing a definition of an angle of elevation and an azimuth.

An azimuth and an angle of elevation are defined with respect to the liquid crystal display as shown in FIG. 34.

The direction which halves the directions of the orientating process of the upper and lower orientation layers of the liquid crystal display is set to 0°. The azimuth is defined counterclockwise when viewed from the display face toward the rear face direction. An angle with the normal line of the substrate plane is defined as an angle of elevation.

An angle between the direction of the orientating process of the lower polarizer 11 and the lower orientation layer 10 should be equal to approximately 45°.

The liquid crystal display device produces a display by using the change in the polarization state of the transmission light in association with the change in the applied voltage. The change in the polarization state depends on the polarization state of the light incident on the liquid crystal layer, that is, an angle of an absorption axis of the lower polarizer.

When an angle between the absorption axis of the lower polarizer and the direction of the orientating process of the lower orientation layer is set to a, the change in the polarization state is maximum when the angle a lies within a range from 40° to 50°, preferably is equal to 45°.

When the direction of torsion of the liquid crystal layer is set to the left and the twist angle is set to Θ, since the azimuth in the direction of the orientating process of the lower orientation layer is equal to (Θ−180°)/2, the azimuth of the absorption axis of the lower polarizer is represented by expression (3)

$$(\Theta2+90°-A(40°\leq a \leq 50°) \tag{3}$$

The twist angle Θ which is sufficiently steep and which gives voltage—transmission ratio characteristics having no hysteresis lies within a range from 200° to 200°. The azimuth in the absorption axis of the lower polarizer in this case lies within a range from 140° to 185°.

The azimuth of the retardation axis of the phase plate is determined as follows.

Since the phase plate is disposed between the liquid crystal cell and the upper polarizer in the embodiment of the present invention, the phase plate changes the polarization state of the light which passes through the liquid crystal layer.

In order to improve the contrast ratio by reducing the transmission factor at the time of the shade display, each of the lights having wavelengths which enter the upper polarizer have to be converted to a linear polarization in which the direction of vibration is the same by using the phase plate.

As described in II Proceedings of the 9th International Display Research Conference", pp. 312 to 315, the method of setting the azimuth of the slow axis of the phase plate and the retardation is expressed by using a Poincare sphere.

The Poincare sphere denotes that a sphere of a radius of 1 having stokes parameters ($S_1$, $S_2$, $S_3$) as three axes and every polarization state corresponds to one point on the Poincare sphere. For example, a linear line polarization corresponds to a line which perpendicularly crosses a plane ($S_1$, $S_2$).

The stokes parameters in this instance are defined by the following expressions by using an X-axis component $E_x$, a Y-axis component $E_y$, and a phase difference $\delta$ of the components $E_x$ and $E_y$.

$$S_1 = (E_X^2 - E_Y^2)/(x^2 + E_Y^2) \qquad (4)$$

$$S_2 = 2E_X E_Y \cos\delta/(x^2 + E_Y^2) \qquad (5)$$

$$S_3 = 2E_X E_Y \sin\delta/(x^2 + E_Y^2) \qquad (6)$$

Conversion of the polarization state by the phase plate is expressed by a rotation around the straight line passing through the center of the Poincare sphere included in the parameter $(S_1, S_2)$ plane. The polarization state by the phase plate is converted to linear movement on the Poincare sphere projected on the plane $(S_1, S_2)$.

The azimuth on the Poincare sphere projected on the plane $(S_1, S_2)$ of the straight line as a center of the rotation is twice as large as the azimuth of the slow axis of the phase plate. By using the wavelength $\lambda$ and the retardation $\lambda$nd, the rotation angle $\Psi$ is expressed as $\Psi = 2\pi\Delta nd/\lambda$ (unit is radian).

Figure 30:
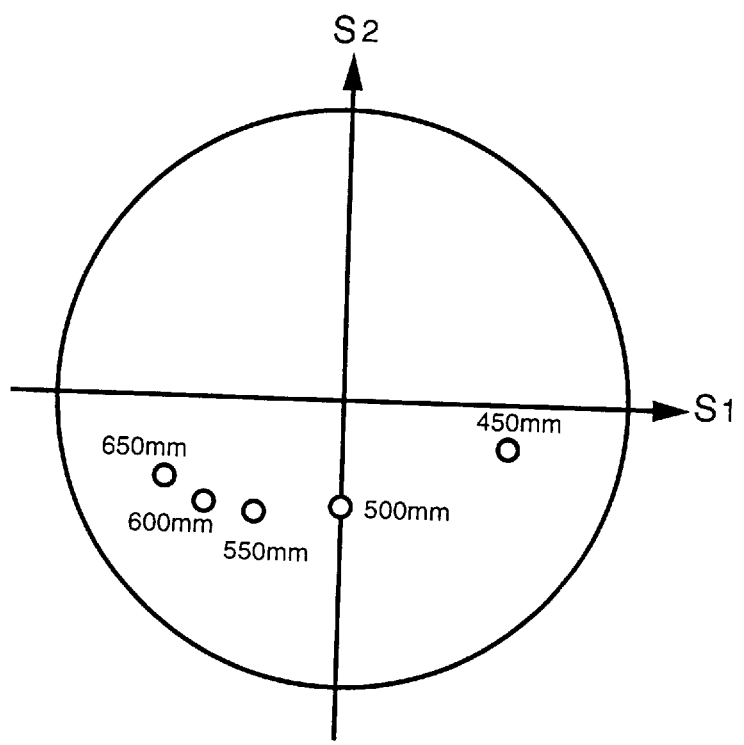
FIG. 30 is an explanatory diagram of a Poincare sphere projected on a $(S_1, S_2)$ plane, which is used for expressing a polarization state of a light having an angled wavelength passing through a liquid crystal layer.

FIG. 30 shows an example of the polarization state in wavelengths of the light which passes through the liquid crystal layer to which a higher voltage among the two or more applied voltages is applied.

FIG. 30 shows a Poincare sphere projected onto the plane $(S_1, S_2)$. It is characteristic that points showing the polarization states of the wavelengths are distributed almost linearly.

Figure 31:
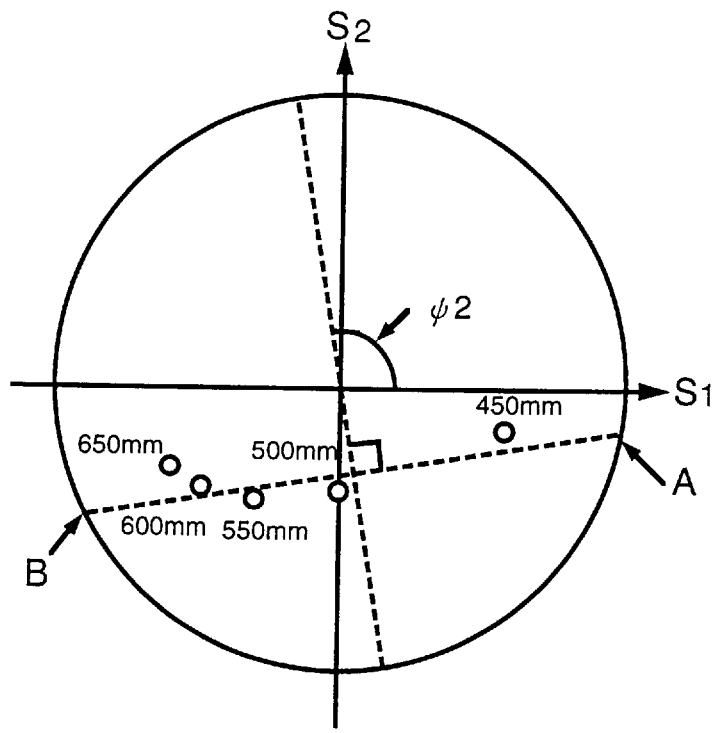
FIG. 31 is an explanatory diagram of a Poincare sphere projected on a $(S_1, S_2)$ plane, which is used for expressing a method of setting an azimuth of a slow axis and a retardation of a phase plate.

By using the characteristic of the distribution of the polarization states in the respective wavelengths, the slow axis and the retardation of the phase plate can be determined as shown in FIG. 31.

FIG. 31 shows a Poincare sphere projected on the plane $(S_1, S_2)$ in a manner similar to FIG. 30. First, a straight line which passes through the points indicative of the polarization states of the wavelengths most, namely, a regression line, is drawn as shown by a broken line.

The half of the azimuth of the line which perpendicularly crosses the regression line becomes the azimuth of the slow axis of the phase plate which is expressed as follows:

$$180° - \Theta/2 \qquad (7)$$

In a range of the twist angle mentioned above, the azimuth lies within a range from 45° to 80°.

Further, the regression line also represents the direction of the movement of each of the points indicative of the polarization states of the wavelengths.

Also, attention is paid to transmission light having a wavelength of 550 nm at which visibility of a human is maximum. When the retardation of the phase plate is set to approximately 380 nm, a point indicative of the polarization state of the transmission light having a wavelength of 550 nm is moved to a point (point A in FIG. 31) on the line which crosses the plane $(S_1, S_2)$. That is, it is converted to a linear polarization.

Transmission lights having other wavelengths are converted to polarization states each of which is substantially the same as the above polarization state.

The absorption axis of the upper polarizer is set to half of the azimuth of the point A in FIG. 31. Since the absorption rate of the upper polarizer for transmission light having the wavelength 550 nm becomes maximum in this instance, the transmission ratio at the time of the shade display is reduced and the contrast ratio can be improved.

In the case where the angle between the absorption axis of the upper polarization plate and the direction of the orientating process of the lower orientation layer lies within a range from 40° to 50°, the azimuth of the point A is experimentally obtained as $(350° - 2a - \Theta)$. The azimuth of the absorption axis of the upper polarizer is consequently expressed as follows:

$$175° - a - \Theta/2 \qquad (8)$$

In the above-mentioned range of the twist angle, the azimuth of the absorption axis of the upper polarizer lies within a range from −10° to 35°.

The retardation of the phase plate is changed in the azimuth of the absorption axis of the lower polarizer, the azimuth of the retardation axis of the phase plate, and the azimuth of the absorption axis of the upper polarizer which are determined as mentioned above and the colorlessness degree of the transmission spectrum at the time of the bright display in the normal line direction of the substrate plane of the liquid crystal display is evaluated by using a UCS chromaticity coordinate system in which the color difference is more uniform.

Coordinates $(u_0 = 0.201, v_0 = 0.460)$ of a C light source are assumed to be perfectly colorless. The degree W of colorlessness is defined by using a distance from the coordinates of the C light source as indicated by the following equation.

$$W = \sqrt{[(u-u_0)^2 + (v-v_0)^2]} \qquad (9)$$

Needless to say, the transmission spectrum becomes colorless as the degree W is made smaller.

Figure 32:
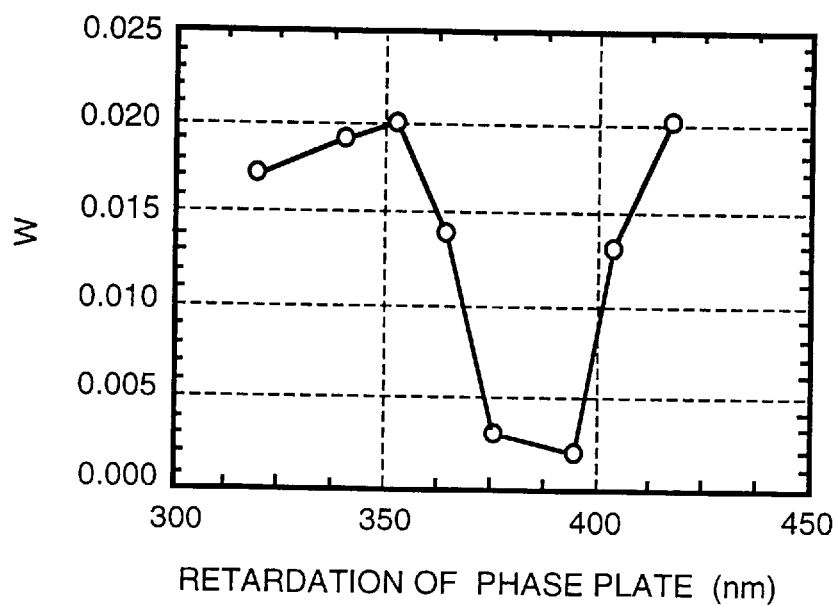
FIG. 32 is a characteristic diagram showing the dependency of a colorlessness degree W of a transmission light in a liquid crystal display on the retardation of a phase plate.

The dependency of the colorlessness degree W on the retardation of the phase plate is as shown in FIG. 32. As will be understood from FIG. 32, the degree W of colorlessness is equal to 0.02 or less when the retardation lies within a range from 320 nm to 420 nm, so that a colorlessness state of the transmission spectrum in the normal line direction of the substrate plane is sufficiently obtained.

Since the contrast ratio is 10:1 or larger and the transmission ratio at the time of the bright display is equal to 28% or larger in such a range, it will be understood that the contrast ratio and the transmission ratio sufficiently satisfy the requested performances.

Figure 33:
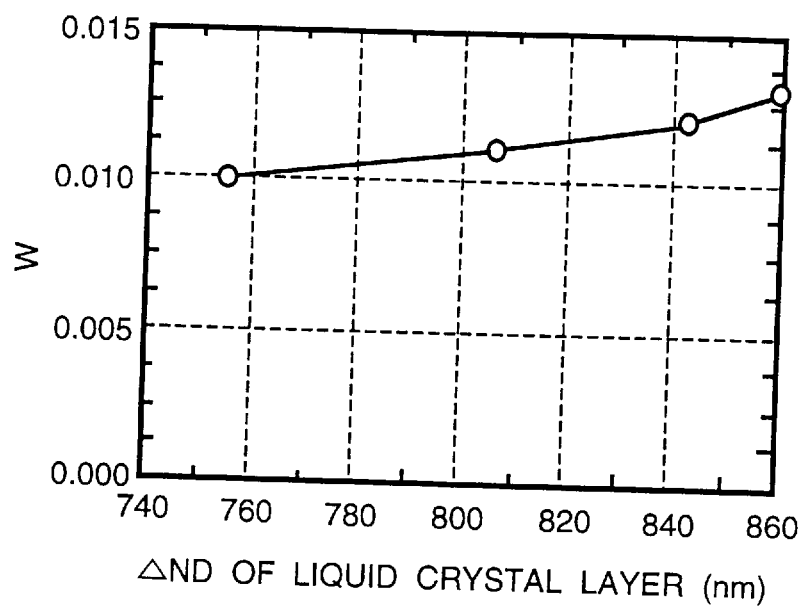
FIG. 33 is an explanatory diagram showing the relation between the colorlessness degree W of the transmission light of the liquid crystal display device and Δnd of a liquid crystal layer (the product of a birefringence of the liquid crystal layer and the layer thickness)

Further, by changing $\Delta n$ of the liquid crystal layer (the product of the $\Delta n$ of the liquid crystal material in the bulk state and the thickness d of the liquid crystal layer), the colorlessness degree W is measured. Accordingly, the colorlessness degree W equal to 0.02 or less is obtained at any value of $\Delta nd$ as shown in FIG. 33.

As mentioned above, the transmission spectrum in the direction of the normal line of the substrate plane is made colorless and a high transmission ratio and a high contrast ratio are obtained.

A case of making the transmission spectrum colorless in a light incident direction will now be described.

The situation of use of the reflective liquid crystal display device first will be considered and the light incident direction will be specified.

When a case of using the reflective liquid crystal display device in an office is presumed, light is usually irradiated from the upper direction. The user uses the reflective liquid crystal display device by inclining it to a certain extent.

In this instance, the azimuth is usually set to 0° in the horizontal direction so that the viewing angle characteristics are symmetrical with respect to the right and left directions and an inclination angle is set to, for example, 30°.

Since a plurality of illuminations on the ceiling are light sources in such a state, the azimuth of the light incident direction is equal to approximately 90° and the angle of elevation is approximately 30° to 60°.

In the case where the reflective liquid crystal display device is used under a condition other than that of an office, for example, when the reflective liquid crystal display device is mounted on a portable information terminal and is used outside, the light incident direction is considered to be substantially the same.

When the colorlessness degree W is equal to 0.04 or less, a display can be sensed as almost colorless.

On the other hand, as shown by the expression (2), since the display color of the reflective liquid crystal display device is determined by the product of the transmission spectrum at the time the light is incident and the transmission spectrum when the light is reflected, even if the colorlessness degree W is equal to 0.04 or less, when the main wavelengths of both of them are close, a coloring is emphasized and the degree W of the product of the both of the transmission spectra exceeds 0.04.

In the embodiment, therefore, in order to prevent the coloring even in the case where the dominant wavelengths of the transmission spectra at the times the light is incident and the light is reflected, a condition on which any of the colorlessness degree W of all of the spectra is equal to 0.02 or less is sought.

With respect to the transmission spectrum at the time of the bright display in the direction of the normal line of the substrate plane, W=0.003.

Figure 35:
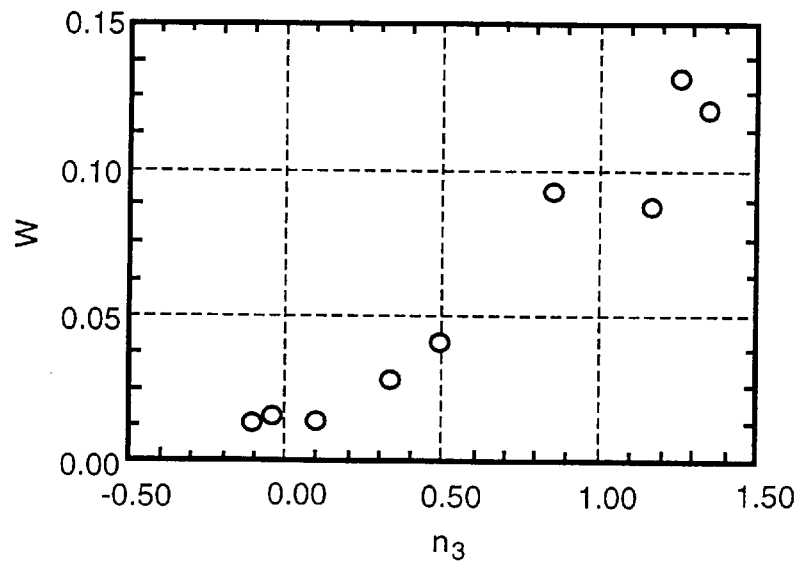
FIG. 35 is a characteristic diagram showing the dependency of the colorlessness degree W of the transmission light in the liquid crystal display device for a characteristic parameter $n_3$ indicative of the magnitude of refractive indices of three axes of the phase plate.

With respect to the phase plate 7, when refractive indices of the phase plate in the directions of the two electromagnetic principal axes which perpendicularly cross in the plane are set to $n_x$ and $n_y$ ($n_x > n_y$) and the refractive index in the thickness direction of the phase plate is set to $n_z$, the characteristic $n_3$ of the phase plate defined by a following equation 30, that is, $$n_3 = (n_Z - n_X)/(n_Y - n_X) \qquad (10)$$

is used and by changing the characteristic $n_3$ the colorlessness degree W of the transmission spectrum in the light entering direction is measured. A result as shown in FIG. 35 is consequently derived.

That is, when the characteristic $n_3$ of the phase plate is positive, the value of the degree W is large and the main wavelength of the transmission spectrum is equal to approximately 605 nm and is colored almost brown.

Figure 36:
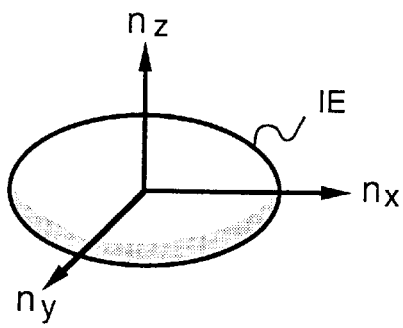
FIG. 36 is an explanatory diagram showing an example of an index ellipsoid of the phase plate.

Consequently, an index ellipsoid in this instance looks like a rugby ball as shown in FIG. 36.

As the characteristic $n_3$ is reduced, the value of the degree W is also reduced. The degree W is equal to 0.02 or less in an area where the characteristic $n_3$ is equal to 0.3 or less. The transmission spectrum is almost colorless in this area.

Figure 37:
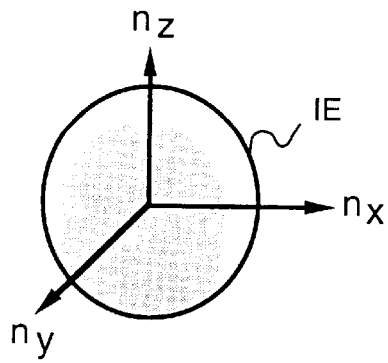
FIG. 37 is an explanatory diagram showing another example of the index ellipsoid of the phase plate.

The index ellipsoid in this instance is in a converging lens shape as shown in FIG. 37. Although it is not clearly shown in FIG. 37, it is intended to be a hemisphere shape.

In the embodiment, therefore, the phase plate 7 is constructed in a manner such that the characteristic $n_3$ defined by the expression (10) is equal to 0.3 or less, thereby simultaneously making the transmission spectra of the liquid crystal display in the light incident direction and the light reflecting direction colorless.

A note-size personal computer on which the reflective liquid crystal display device according to the embodiment 21 is mounted is placed on a desk in an office with the inclination angle of 30°. A display state is observed from the direction of the normal line of the plane of the liquid crystal display device.

The polarizer and the phase plate are set to the optical conditions in the ranges obtained as mentioned above. That is, in FIG. 28, the azimuth of the absorption axis of the upper polarizer 8 is equal to 20°, the azimuth of the absorption axis of the lower polarizer 11 is equal to 165°, the retardation in the wavelength 550 nm of the phase plate 7 is equal to 380 nm, the azimuth of the slow axis is equal to 60° and the characteristic $n_3$ is consequently equal to 0.01.

As a result, the colorlessness degrees W of the transmission spectra in the light incident direction (the azimuth is equal to 90° and the angle of elevation is equal to 30° to 60°) and in the light reflecting direction (the angle of elevation is equal to 0°) of the liquid crystal display device 1 are 0.010 and 0.010, respectively.

The display state at the time of the bright display is almost colorless. In this instance, the surface brightness is equal to 65 cd/m$^2$ and a contrast ratio of 5:1 is derived.

According to the embodiment 17, the transmission spectra in the main light incident direction and the light reflecting direction of the liquid crystal display device can be made colorless. The colorless display with high brightness is consequently obtained, so that a reflective liquid crystal display device having good visibility can be obtained.

A case of further setting the characteristic $n_3$ of the phase plate to 1.0 in the liquid crystal display device of the embodiment 17 will now be considered for comparison.

The colorlessness degree W of the transmission spectra in the main light entering direction (the azimuth is equal to 90°, the angle of elevation is equal to 30° to 60°) and the light reflecting direction (the angle of elevation is equal to 0°) are equal to 0.065 and 0.010, respectively.

When the liquid crystal display device is similarly mounted on a note-size personal computer and the computer is put on a desk in an office and is used, the light display is colored brown and the surface brightness at the time of the bright display is equal to 40 cd/m$^2$ and the contrast ratio is equal to 3:1.

When the details are further observed, although the transmission spectrum in the main light incident direction is colorless, the transmission spectrum in the main light reflecting direction is colored. It is known that the light display is consequently colored brown.

In a manner similar to the above, the retardation of the phase plate is further set to 120 nm in the liquid crystal display device of the embodiment 21 for comparison. The colorlessness degrees W of the transmission spectra in the main light incident direction (the azimuth is equal to 90° and the angle of elevation is equal to 30° to 60°) and in the light reflecting direction (the angle of elevation is equal to 0°) are equal to 0.035 and 0.041, respectively.

As a result, when the liquid crystal display device is similarly mounted on a note-size personal computer, the computer is put on a desk in an office and the display color is observed, since both of the transmission spectra in the main light incident direction and the light reflecting direction are colored in this case, the light display is colored purple. The surface brightness of the light display is equal to 20 cd/m$^2$ and a contrast ratio of only 2:1 is obtained.

It is understood that if both of the transmission spectra in the main light entering direction and the light reflecting direction are not made colorless in the reflective liquid crystal display device, a colorless display with high brightness cannot be obtained.

[Embodiment 18]

In an embodiment 18, the directional reflector is used as a directional reflector in the embodiment 21 and the angles between a plurality of reflection surfaces and the plane of the liquid crystal display device are set, respectively, to the three values of 0°, 10°, and 20°. The other features of the construction are substantially the same as those in embodiment 17.

The azimuth of the main light entering direction is equal to 90° and the angle of elevation is equal to 20° to 60° in the embodiment 22. The angle of elevation in the light reflecting direction is equal to 0° and the colorlessness degrees W of the transmission spectra are equal to 0.010 and 0.010, respectively.

The reflective liquid crystal display device according to the embodiment 18 is mounted on a portable information terminal and the terminal is used outside in the hand.

When the display colors are observed by variously changing the angles and the like, the light display is almost colorless in any case.

On the other hand, the surface brightness of the light display is largely changed in accordance with the use conditions and is equal to 210 to 40 cd/m$^2$ which can be used in any case. A contrast ratio of 5:1 is obtained.

In the embodiment 18 as well, by making the transmission spectra in the main light incident direction and the light reflecting direction of the liquid crystal display device colorless, a colorless display with a high brightness can be obtained.

Since the angles of the reflection surfaces of the directional reflector 13 are set to three different angles, namely, 0°, 10°, and 20° in the embodiment 18, the light incident direction is widened so that the wider use conditions can be available.

[Embodiment 19]

In an embodiment 19, although a directional reflector is used as a directional reflector as in the embodiment 17, the reflection surfaces are not perfect flat surfaces, but comprise a reflector wherein fine reflection surfaces exist on each of the reflection surfaces, thereby forming a light scattering surface. The other features of the construction are substantially the same.

The light scattering surface is formed by using a sand blasting processed mold when the directional reflector is manufactured.

In the embodiment 19 as well, the colorlessness degrees W of the transmission spectra in the main light entering direction (the azimuth is equal to 90° and the angle of elevation is equal to 20° to 70°) and in the light reflecting direction (the angle of elevation is equal to 0°) are equal to 0.015 and 0.010, respectively.

When the reflective liquid crystal display device according to the embodiment 19 is mounted on a note-size personal computer, the computer is put on a desk in an office with the liquid crystal display device inclined at an angle of 30°, and the display state is observed from the direction of the normal line of the plane of the liquid crystal display device.

It can be confirmed that a light display which is almost colorless is obtained. The surface brightness at the time of the light display is equal to 60 cd/m$^2$ and the contrast ratio is equal to 5:1, so that it is understood that sufficient performance can be obtained.

[Embodiment 20]

In an embodiment 20, the cross sectional shape of the directional reflector comprising the light scattering surface in the embodiment 19 is changed to the shape and angles between the reflection surfaces and the plane of the liquid crystal display set to 0°, 10° and 205. The other features of construction are substantially the same.

The colorlessness degrees W of the transmission spectra in the main light entering direction (the azimuth is equal to 90° and the angle of elevation is equal to 20° to 60°) and the light reflecting direction (the angle of elevation is equal to 0°) are equal to 0.010 and 0.010, respectively.

When the reflective liquid crystal display device according to the embodiment 20 is mounted on a portable information terminal, the terminal is used outside in the hand, and the display colors are observed by variously changing the angles and the like, a light display which is almost colorless is obtained in any case.

Although the surface brightness at the time of the light display is largely changed in accordance with the conditions of use and is equal to 180 to 450 cd/m$^2$, the brightness can be used in any case and the contrast ratio in this case is equal to 5:1.

Thus, according to the embodiment 20, a colorless display having excellent visibility and high brightness can be obtained.

Since the reflection surfaces have three different angles and also exhibit a light scattering performance, the light incident direction is widened and the liquid crystal display device can consequently correspond to wider use conditions.

[Embodiment 21]

In an embodiment 21, the characteristic $n_3$ of the phase plate 7 is set to −0.01 in the reflective liquid crystal display device. The other features of the construction are substantially the same.

In the embodiment 21, the colorlessness degrees W of the transmission spectra in the main light incident direction (the azimuth is equal to 90° and the angle of elevation is equal to 30° to 60°) and the light reflecting direction (the angle of elevation is equal to 0°) are equal to 0.009 and 0.010, respectively.

When a note-size personal computer on which the reflective liquid crystal display device according to the embodiment 21, with an inclination angle of 300, is put on a desk in an office and the display state is observed from the normal line direction of the plane of the liquid crystal display, an almost colorless bright display is obtained.

The surface brightness at the time of the bright display in this case is equal to 65 cd/m$^2$ and the contrast ratio is equal to 5:1.

It is therefore understood that a colorless display with high brightness can be obtained by making the transmission spectra in the main light incident direction and the light reflecting direction of the liquid crystal display device colorless in the embodiment 21 as well.

[Embodiment 22]

In FIG. 31, when the retardation of the phase plate is set to approximately 600 nm, a point indicative of the polarization state of the transmission light having a wavelength of 550 nm is moved to a point B on the line which crosses the $(S_1, S_2)$ plane shown in FIG. 31. The transmission light having other wavelengths are converted to polarization states substantially equal to the above polarization state.

It is assumed that the absorption axis of the upper polarizer is set to be ½ of the azimuth of the point B in FIG. 31.

In the case where the angle between the absorption axis of the lower polarizer and the direction of the orientating process of the lower orientation layer lies within a range from 40° to 50°, it is experimentally determined that the azimuth of the point 3 is equal to (370°−Θ+2a).

The azimuth of the absorption axis of the upper polarizer is represented by the following expression.

$$185° - \Theta/2 + a \qquad (11)$$

In a range of the twist angle which lies within a range from 200° to 270°, the azimuth of the absorption axis of the upper polarizer consequently lies within a range from −20° to 20°.

Figure 38:
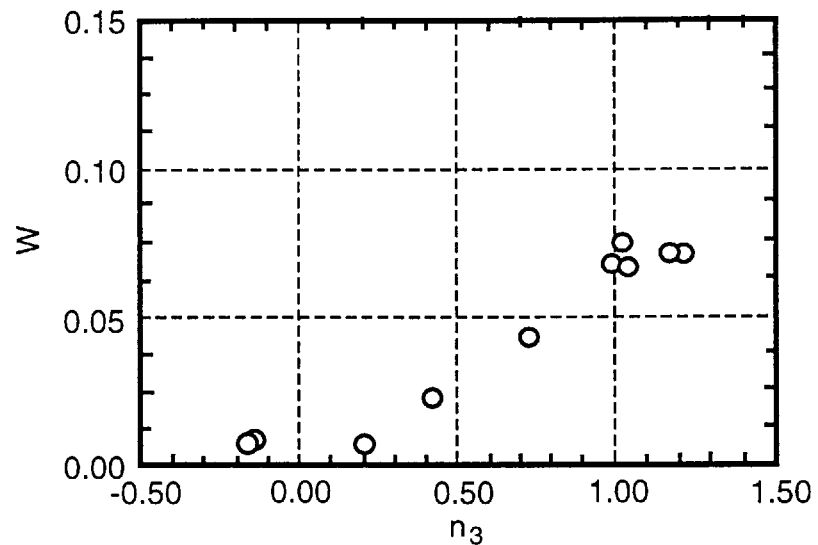
FIG. 38 is a characteristic diagram showing the dependency of the colorlessness degree W of the transmission light in the liquid crystal display for the characteristic parameter $n_3$ indicative of the magnitude of the refractive indices of the three axes of the phase plate.

The dependency for the characteristic $n_3$ of the colorlessness degree W in this case is as shown in FIG. 38. Although the inclination of the plots is different, a tendency similar to that shown in FIG. 35 is seen.

That is, when the characteristic $n_3$ is positive, the colorlessness degree W becomes large and the transmission spectrum is colored yellow (the main wavelength is equal to approximately 585 nm). In an area where the characteristic $n_3$ is equal to about 0.3 or less, it is understood that the colorlessness degree W is equal to 0.02 or less and the transmission spectrum is colorless.

As mentioned above, after determining the azimuth of the absorption axis of the lower polarizer, the azimuth of the slow axis of the phase plate, and the azimuth of the absorption axis of the upper polarizer, the retardation of the phase plate is changed and the hue of the bright display in the normal line direction of the substrate plane of the liquid crystal display is evaluated as follows.

Figure 39:
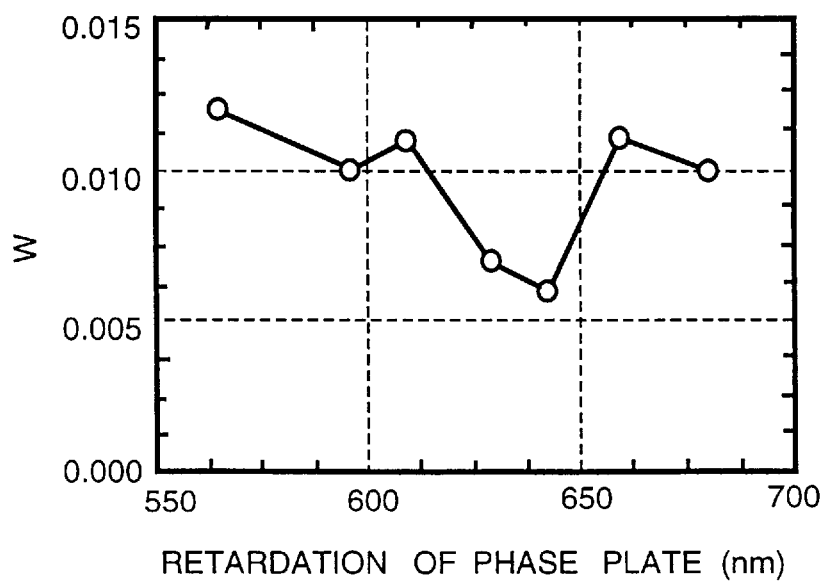
FIG. 39 is a characteristic diagram showing the dependency of the colorlessness degree W of the transmission light in the liquid crystal display on the retardation of the phase plate.
Figure 40:
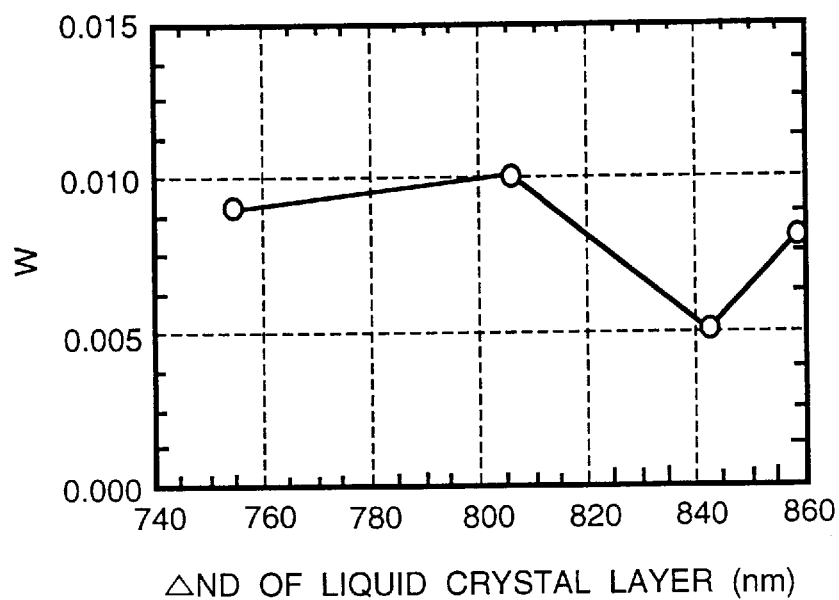
FIG. 40 is an explanatory diagram showing the relation between the colorlessness degree W of the transmission light in the liquid crystal display device and :nd (the product of the birefringence of the liquid crystal layer and the layer thickness) of the liquid crystal layer.

The dependency of the colorlessness degree W on the retardation of the phase plate in this case is as shown in FIG. 39. The colorlessness degree W is equal to 0.02 or less when the retardation lies within a range from 540 nm to 680 nm, and the transmission spectrum in the normal line direction of the substrate plane is found to be almost colorless.

The contrast ratio is equal to 8:1 or larger and the transmission ratio at the time of the light display is equal to 25% or larger in such a range and sufficient values are obtained in any case.

When the colorlessness degree W is measured by changing Δnd of the liquid crystal layer (the product of the Δn of the liquid crystal material in the bulk state and the thickness d of the liquid crystal layer), the colorlessness degree W is equal to 0.02 or less at any Δnd.

In the above case as well, the transmission spectrum in the normal line direction of the substrate plane is made colorless and a high transmission ratio and a high contrast ratio are obtained.

In the embodiment 22, the retardation of the phase plate 7 in the embodiment 17 and the azimuth of the absorption axis of the upper polarizer 8 are changed to values within the range obtained by the above experiment and the retardation in case of a wavelength of 550 nm of the phase plate 7 is set to 600 nm and the azimuth of the absorption axis of the upper polarizer 8° is set to 105°, and after that, the display state is observed.

The azimuth in the main light incident direction is set to 90°, the angle of elevation is set to 30° to 60°, and the angle of elevation in the light reflecting direction is set to 0°. The colorlessness degrees W of the transmission spectra are equal to 0.012 and 0.003, respectively, and the bright display is almost colorless. The surface brightness at the time of the light display is equal to 60 cd/m² and the contrast ratio is equal to 6:1.

According to the embodiment 22 as well, the transmission spectra in the main light incident direction and the light reflecting direction can be made colorless and a highly efficient reflective liquid crystal display device having excellent visibility in which the display is colorless and highly bright can be obtained.

For comparison, when the characteristic $n_3$ of the phase plate 7 is further set to 1.0 in the embodiment 22 as well, the colorlessness degrees W of the transmission spectrum in the main light entering direction (the azimuth is equal to 90° and the angle of elevation is equal to 30° to 60°) and the light reflecting direction (the angle of elevation is equal to 0°) are equal to 0.100 and 0.010, respectively.

Although the transmission spectrum in the main light incident direction is colorless, the transmission spectrum in the main light reflecting direction is colored. When the display color is observed, the light display is colored brown.

Consequently, the contrast ratio is equal to only 3:1 for a surface brightness of 60 cd/m². In this case as well, it is found that the colorless display with a high brightness cannot be obtained if the transmission spectra in the main light incident direction and the light reflecting direction are not simultaneously made colorless.

For comparison, the retardation of the phase plate is further set to 500 nm in the liquid crystal display device of the embodiment 22.

In this case, the colorlessness degree W of the transmission spectrum in the main light incident direction (the azimuth is equal to 90° and the angle of elevation is equal to 30° to 60°) is equal to 0.044 and the colorlessness degree W of the transmission spectrum in the light reflecting direction (the angle of elevation is equal to 0°) is equal to 0.029.

When such a liquid crystal display device is mounted on a note-size personal computer which is positioned on a desk in an office and the display color is observed, since both of the transmission spectra in the main light entering direction and the light reflecting direction are colored, the light display is colored green and the surface brightness at the time of the light display is equal to 55 cd/m² and a contrast ratio of only 2:1 is obtained.

From this case as well, it is understood that if the transmission spectra in the main light entering direction and the light reflecting direction are not simultaneously made colorless, a colorless display with high brightness cannot be obtained.

According to the invention, since both of the transmission spectra in the main light entering direction and the light reflecting direction can be simultaneously made colorless, a reflective liquid crystal display device having excellent visibility in which the display is colorless and highly bright can be easily obtained.

What is claimed is:

1. A reflective liquid crystal display device comprising:
   a reflector;
   a liquid crystal cell formed by laminating upper and lower orientation layers, upper and lower electrodes, upper and lower substrates, and upper and lower polarizers arranged in order above and below a liquid crystal layer, respectively;
   said liquid crystal cell is provided with a viewing angle dependence so that a transmission ratio of a dark display section to a bright display section for light incident upon said liquid crystal cell is less than 2 at a viewing angle range which includes a direction which is normal to a plane of a surface of said reflector;
   wherein the direction of the viewing angle range is aligned with the normal with respect to said liquid crystal cell;
   wherein a dark display shadow is substantially extinguished; and
   wherein the surface tilt angle of said reflector with respect to the plane of extension of said reflector is within a range of 10° to 35°.

2. A reflective liquid crystal display device according to claim 1, wherein said upper and lower substrates are first and second transparent substrates sandwiching said liquid crystal layer, said first substrate being disposed on a front surface side and said second substrate being disposed on a rear surface side of the liquid crystal layer;
   wherein a phase plate is disposed on the outer surface of said first transparent substrate;
   said upper polarizer being a first polarizer disposed on the outer surface of said phase plate;
   said lower polarizer being a second polarizer disposed on the outer side of said second transparent substrate; and said reflector being a directional reflector disposed on the outer side of said second polarizer; and wherein when refractive indices of said phase plate in the directions of two electro-optical principal axes which perpendicularly cross in a plane of said phase plate are set to $n_x$ and $n_y$ ($n_x > n_y$) and a refractive index in the direction of the thickness of said phase plate is set to $n_z$, refractive index characteristics of said phase plate satisfy the following expression:

$$0.3 \geq (n_Z - n_X)/(n_y - n_X);$$

when a retardation of said phase plate lies within a range from 320 nm to 420 nm, and the direction which halves the direction of an orientating process of said upper and lower orientation layers which are first and second orientation layers disposed on the facing surfaces of said first and second transparent substrates, is set to an azimuth of 0° and the azimuth is defined counterclockwise when viewed from outside of said first transparent substrate, an azimuth of an absorption axis of said second polarizer lies within a range from 140° to 185°;

an azimuth of a slow axis of said phase plate lies within a range from 45° to 80°; and an azimuth of an absorption axis of said first polarizer lies within a range from −10° to 35°.

3. A reflective liquid crystal display device according to claim 1, wherein said upper and lower substrates are first and second transparent substrates sandwiching said liquid crystal layer, said first substrate being disposed on a front surface side and said second substrate being disposed on a rear surface side of said liquid crystal layer;

wherein a phase plate is disposed on the outer surface of said first transparent substrate;

said first polarizer being a first polarizer disposed on the outer surface of said phase plate;

said lower polarizer being a second polarizer disposed on the outer side of said second transparent substrate; and said reflector being a directional reflector disposed on the outer side of said second polarizer; and wherein when refractive indices of said phase plate in the directions of two electro-optical principal axes which perpendicularly cross in a plane of said phase plate are set to $n_x$ and $n_y$ ($n_x > n_y$) and a refractive index in the direction of the thickness of said phase plate is set to $n_z$, refractive index characteristics of said phase plate satisfy the following expression:

$$0.3 \geq (n_Z - n_X)/(n_y - n_X);$$

when a retardation of said phase plate lies within a range from 540 nm to 680 nm, and the direction which halves the direction of an orientating process of said upper and lower orientation layers which are first and second orientation layers disposed on the facing surfaces of said first and second transparent substrates, is set to an azimuth of 0° and the azimuth is defined counterclockwise when viewed from outside of said first transparent substrate, an azimuth of an absorption axis of said second polarizer lies within a range from 140° to 185°;

an azimuth of a slow axis of said phase plate lies within a range from 45° to 80°; and an azimuth of an absorption axis of said first polarizer lies within a range from 90° to 35°.

4. A reflective liquid crystal display device comprising:

a reflector;

a liquid crystal cell formed by laminating upper and lower orientation layers, upper and lower electrodes, upper and lower substrates, and upper and lower polarizers arranged in order above and below a liquid crystal layer, respectively;

said liquid crystal cell is provided with a viewing angle dependence so that a transmission ratio of a dark display section to a bright display section for light incident upon said liquid crystal cell is less than 2 at a viewing angle range which includes a direction which is normal to a plane of a surface of said reflector;

wherein the direction of the viewing angle range is aligned with the normal with respect to said liquid crystal cell;

wherein a dark display shadow is substantially extinguished;

wherein the surface tilt angle of said reflector with respect to the plane of extension of said reflector is within a range of 10° to 35°, wherein a polarization change Δ defined by the following formula is at a minimum value in the direction of a user's azimuth angle of 90° and is at a value greater than 0.5 at a direction normal to a plane of the display device $$\Delta = C(1 - S_{1B}S_{1D} - S_{2B}S_{2D} - S_{3B}S_{3D}),$$

wherein C is a predetermined value, $S_{1B}$, $S_{2B}$ and $S_{3B}$ are stokes parameters for indicating the polarization light condition of a transmission polarization light at the bright display section, and $S_{1D}$, $S_{2D}$, and $S_{3D}$ are stokes parameters for indicating a polarization light condition of a transmission polarization light at the dark display section.

5. A reflective liquid crystal display device according to claim 4, wherein said upper and lower substrates are first and second transparent substrates sandwiching said liquid crystal layer, said first substrate being disposed on a front surface side and said second substrate being disposed on a rear surface side of the liquid crystal layer;

wherein a phase plate is disposed on the outer surface of said first transparent substrate;

said upper polarizer being a first polarizer disposed on the outer surface of said phase plate;

said lower polarizer being a second polarizer disposed on the outer side of said second transparent substrate; and said reflector being a directional reflector disposed on the outer side of said second polarizer; and wherein when refractive indices of said phase plate in the directions of two electro-optical principal axes which perpendicularly cross in a plane of said phase plate are set to $n_x$ and $n_y$ ($n_x > n_y$) and a refractive index in the direction of the thickness of said phase plate is set to $n_Z$, refractive index characteristics of said phase plate satisfy the following expression:

$$0.3 \geq (n_Z - n_X)/(n_y - n_X);$$

when a retardation of said phase plate lies within a range from 320 nm to 420 nm, and the direction which halves the direction of an orientating process of said upper and lower orientation layers which are first and second orientation layers disposed on the facing surfaces of said first and second transparent substrates, is set to an azimuth of 0° and the azimuth is defined counterclockwise when viewed from outside of said first transparent substrate, an azimuth of an absorption axis of said second polarizer lies within a range from 140° to 185°;

an azimuth of a slow axis of said phase plate lies within a range from 45° to 80°; and an azimuth of an absorption axis of said first polarizer lies within a range from −10° to 35°.

6. A reflective liquid crystal display device according to claim 4, wherein said upper and lower substrates are first and second transparent substrates sandwiching said liquid crystal layer, said first substrate being disposed on a front surface side and said second substrate being disposed on a rear surface side of said liquid crystal layer;

wherein a phase plate is disposed on the outer surface of said first transparent substrate;

said first polarizer being a first polarizer disposed on the outer surface of said phase plate;

said lower polarizer being a second polarizer disposed on the outer side of said second transparent substrate; and said reflector being a directional reflector disposed on the outer side of said second polarizer; and wherein when refractive indices of said phase plate in the directions of two electro-optical principal axes which perpendicularly cross in a plane of said phase plate are set to $n_x$ and $n_y$ ($n_x > n_y$) and a refractive index in the direction of the thickness of said phase plate is set to $n_z$, refractive index characteristics of said phase plate satisfy the following expression:

$$0.3 \geq (n_z - n_x)/(n_y - n_x);$$

when a retardation of said phase plate lies within a range from 540 nm to 680 nm, and the direction which halves the direction of an orientating process of said upper and lower orientation layers which are first and second orientation layers disposed on the facing surfaces of said first and second transparent substrates, is set to an azimuth of 0° and the azimuth is defined counterclockwise when viewed from outside of said first transparent substrate, an azimuth of an absorption axis of said second polarizer lies within a range from 140° to 185°;

an azimuth of a slow axis of said phase plate lies within a range from 45° to 80°; and an azimuth of an absorption axis of said first polarizer lies within a range from 90° to 35°.

* * * * *